United States Patent
Hamada et al.

(10) Patent No.: US 8,229,292 B2
(45) Date of Patent: Jul. 24, 2012

(54) AUTO FOCUS ADJUSTING APPARATUS AND CAMERA SYSTEM

(75) Inventors: Masataka Hamada, Suwon-si (KR); Kazuhiko Sugimoto, Seongnam-si (KR); Toshihiro Hamamura, Seongnam-si (KR); Shuji Yoneyama, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 12/978,901

(22) Filed: Dec. 27, 2010

(65) Prior Publication Data

US 2011/0164865 A1 Jul. 7, 2011

(30) Foreign Application Priority Data

Jan. 5, 2010 (KR) .................. 10-2010-0000573

(51) Int. Cl.
 *G03B 13/36* (2006.01)
(52) U.S. Cl. ......................................... 396/81
(58) Field of Classification Search ............... 396/81, 396/82, 91, 93
 See application file for complete search history.

(56) References Cited

U.S. PATENT DOCUMENTS

| | | | |
|---|---|---|---|
| 5,115,262 A * | 5/1992 | Komiya ................ | 396/91 |
| 7,262,804 B2 * | 8/2007 | Watanabe ............. | 348/349 |
| 2006/0132617 A1 * | 6/2006 | Ohta .................... | 348/220.1 |
| 2009/0201410 A1 * | 8/2009 | Nishiguchi et al. .... | 348/345 |
| 2010/0188558 A1 * | 7/2010 | Gamadia et al. ....... | 348/345 |
| 2010/0302434 A1 * | 12/2010 | Ohta .................... | 348/345 |
| 2011/0164865 A1 * | 7/2011 | Hamada et al. ....... | 396/91 |

FOREIGN PATENT DOCUMENTS

| | | |
|---|---|---|
| JP | 59-208514 A | 11/1984 |
| JP | 2006-064855 A | 3/2006 |

\* cited by examiner

*Primary Examiner* — William Perkey

(74) *Attorney, Agent, or Firm* — Drinker Biddle & Reath LLP

(57) ABSTRACT

An auto focus (AF) adjusting apparatus and a camera system of a lens replaceable camera are disclosed. AF is performed by correcting a location error of a focus lens due to a difference between a frequency band for performing AF detection and a frequency band for determining an improved location of an image surface of an imaging lens, and/or a target region for detecting a focal point.

28 Claims, 25 Drawing Sheets

ΔIB1

| FOCAL LENGTH | A | B | C | D | E | F |
|---|---|---|---|---|---|---|
| 1 | a1 | b1 | c1 | d1 | e1 | f1 |
| 2 | a2 | b2 | c2 | d2 | e2 | f2 |
| 3 | a3 | b3 | c3 | d3 | e3 | f3 |
| 4 | a4 | b4 | c4 | d4 | e4 | f4 |
| 5 | a5 | b5 | c5 | d5 | e5 | f5 |
| 6 | a6 | b6 | c6 | d6 | e6 | f6 |
| ⋮ | ⋮ | ⋮ | ⋮ | ⋮ | ⋮ | ⋮ |
| 30 | a30 | b30 | c30 | d30 | e30 | f30 |
| 31 | a31 | b31 | c31 | d31 | e31 | f31 |
| 32 | a32 | b32 | c32 | d32 | e32 | f32 |

| FOCAL LENGTH | A | B | C | D | E | F |
|---|---|---|---|---|---|---|
| 1 | a1 | b1 | c1 | d1 | e1 | f1 |
| 2 | a2 | b2 | c2 | d2 | e2 | f2 |
| 3 | a3 | b3 | c3 | d3 | e3 | f3 |
| 4 | a4 | b4 | c4 | d4 | e4 | f4 |
| 5 | a5 | b5 | c5 | d5 | e5 | f5 |
| 6 | a6 | b6 | c6 | d6 | e6 | f6 |
| ⋮ | ⋮ | ⋮ | ⋮ | ⋮ | ⋮ | ⋮ |
| 30 | a30 | b30 | c30 | d30 | e30 | f30 |
| 31 | a31 | b31 | c31 | d31 | e31 | f31 |
| 32 | a32 | b32 | c32 | d32 | e32 | f32 |

| FOCAL LENGTH | A | B | C | D | E | F |
|---|---|---|---|---|---|---|
| 1 | a1 | b1 | c1 | d1 | e1 | f1 |
| 2 | a2 | b2 | c2 | d2 | e2 | f2 |
| 3 | a3 | b3 | c3 | d3 | e3 | f3 |
| 4 | a4 | b4 | c4 | d4 | e4 | f4 |
| 5 | a5 | b5 | c5 | d5 | e5 | f5 |
| 6 | a6 | b6 | c6 | d6 | e6 | f6 |
| ⋮ | ⋮ | ⋮ | ⋮ | ⋮ | ⋮ | ⋮ |
| 30 | a30 | b30 | c30 | d30 | e30 | f30 |
| 31 | a31 | b31 | c31 | d31 | e31 | f31 |
| 32 | a32 | b32 | c32 | d32 | e32 | f32 |

LENS 1 (ΔIB1~ΔIB4)
LENS2 (ΔIB1~ΔIB4)
LENS 3 (ΔIB1~ΔIB4)
⋱
LENS 36 (ΔIB1~ΔIB4)

FIG. 13

| FOCAL LENGTH | A | B | C | D | E | F |
|---|---|---|---|---|---|---|
| 1 | a1 | b1 | c1 | d1 | e1 | f1 |
| 2 | a2 | b2 | c2 | d2 | e2 | f2 |
| 3 | a3 | b3 | c3 | d3 | e3 | f3 |
| 4 | a4 | b4 | c4 | d4 | e4 | f4 |
| 5 | a5 | b5 | c5 | d5 | e5 | f5 |
| 6 | a6 | b6 | c6 | d6 | e6 | f6 |
| ⋮ | ⋮ | ⋮ | ⋮ | ⋮ | ⋮ | ⋮ |
| 14 | a14 | b14 | c14 | d14 | e14 | f14 |
| 15 | a15 | b15 | c15 | d15 | e15 | f15 |
| 16 | a16 | b16 | c16 | d16 | e16 | f16 |

LENS 1 (ΔIBeA1~ΔIBeH4)
LENS2 (ΔIBeA1~ΔIBeH4)
LENS 3 (ΔIBeA1~ΔIBeH4)
⋱
LENS 36 (ΔIBeA1~ΔIBeH4)

FIG. 16

| FOCAL LENGTH | G | H | I | J | K | L | M |
|---|---|---|---|---|---|---|---|
| 1 | g1 | h1 | i1 | j1 | k1 | l1 | m1 |
| 2 | g2 | h2 | i2 | j2 | k2 | l2 | m2 |
| 3 | g3 | h3 | i3 | j3 | k3 | l3 | m3 |
| 4 | g4 | h4 | i4 | j4 | k4 | l4 | m4 |
| 5 | g5 | h5 | i5 | j5 | k5 | l5 | m5 |
| 6 | g6 | h6 | i6 | j6 | k6 | l6 | m6 |
| ⋮ | ⋮ | ⋮ | ⋮ | ⋮ | ⋮ | ⋮ | ⋮ |
| 30 | g30 | h30 | i30 | j30 | k30 | l30 | m30 |
| 31 | g31 | h31 | i31 | j31 | k31 | l31 | m31 |
| 32 | g32 | h32 | i32 | j32 | k32 | l32 | m32 |

| FOCAL LENGTH | G | H | I | J | K | L | M |
|---|---|---|---|---|---|---|---|
| 1 | g1 | h1 | i1 | j1 | k1 | l1 | m1 |
| 2 | g2 | h2 | i2 | j2 | k2 | l2 | m2 |
| 3 | g3 | h3 | i3 | j3 | k3 | l3 | m3 |
| 4 | g4 | h4 | i4 | j4 | k4 | l4 | m4 |
| 5 | g5 | h5 | i5 | j5 | k5 | l5 | m5 |
| 6 | g6 | h6 | i6 | j6 | k6 | l6 | m6 |
| ⋮ | ⋮ | ⋮ | ⋮ | ⋮ | ⋮ | ⋮ | ⋮ |
| 30 | g30 | h30 | i30 | j30 | k30 | l30 | m30 |
| 31 | g31 | h31 | i31 | j31 | k31 | l31 | m31 |
| 32 | g32 | h32 | i32 | j32 | k32 | l32 | m32 |

ΔIBeA

ΔIBeB

AUTO FOCUS ADJUSTING APPARATUS AND CAMERA SYSTEM

CROSS-REFERENCE TO RELATED PATENT APPLICATION

This application claims the benefit of Korean Patent Application No. 10-2010-0000573, filed on Jan. 5, 2010, in the Korean Intellectual Property Office, the entire disclosure of which is incorporated herein by reference.

BACKGROUND

1. Field of the Invention

The invention relates to an auto focus (AF) adjusting apparatus of a lens replaceable camera, and a camera system, and more particularly to apparatuses and methods where AF is performed by correcting a location error of a focus lens due to a difference between a frequency band used to determine an AF location and a frequency band for determining an improved location of an image surface of an imaging lens.

2. Description of the Related Art

Many image photographing apparatuses, such as cameras and camcorders, automatically focus on a subject in order to clearly capture a still image or a moving picture. Examples of an auto focusing method for automatically adjusting a focal point may include a contrast auto focusing (AF) method and a phase difference AF method.

The contrast AF method includes obtaining a contrast value with respect to an image signal generated by an imaging sensor while changing a location of a focus lens during a photographing process, and then driving the focus lens to a position where the contrast value is maximized.

The phase difference AF method uses a separate sensing device, apart from an imaging sensor, and includes detecting a focal point location from a phase difference of light applied to the sensing device.

Auto focusing is an important feature for users of image photographing apparatuses because of the convenience it provides.

SUMMARY

Therefore there is a need in the art for an auto focus adjusting apparatus and a camera system, for correctly performing an auto focus (AF) adjusting operation.

According to an aspect of the invention, there is provided an auto focus (AF) adjusting apparatus including an imaging sensor for capturing light transmitted through an imaging lens to generate an image signal; an AF estimation value calculating unit for calculating an AF estimation value with respect to a first frequency band by using the image signal; a focus lens driver for driving a focus lens of the imaging lens in an optical axis direction; a location detector for detecting a location of the focus lens; an optimum location calculating unit for calculating an optimum location of the AF estimation value by using the location of the focus lens and the AF estimation value; a controller for controlling the focus lens to move to the optimum location; and a storage unit for storing optimum location error information occurring due to a difference between a second frequency band for determining an optimum location of an image surface of the imaging lens and the first frequency band, wherein after the optimum location calculation unit calculates the optimum location using the AF estimation value, the controller obtains optimum location error information with respect to the optimum location of the image surface of the imaging lens, and corrects the optimum location by using the optimum location error information.

The AF adjusting apparatus may include a replaceable lens and a body unit, wherein the imaging lens is included in the replaceable lens, and the storage unit may be included in the replaceable lens.

The AF adjusting apparatus may include a replaceable lens and a body unit, wherein the imaging lens is included in the replaceable lens, the replaceable lens may have information regarding a type of lens, the imaging sensor, the AF estimation value calculating unit, the storage unit, and the controller may be included in the body unit, the storage unit stores optimum location error information for each type of lens of the replaceable lens, and the controller may correct the optimum location by using the optimum location error information for each type of lens of the replaceable lens.

The controller may obtain the optimum location error information according to latest information regarding a situation of the imaging lens.

The latest information of the imaging lens may include at least one of information of a focal length, information of a location of the focus lens, and information of a photographing aperture.

The replaceable lens may include a zoom lens, the optimum location error information may vary according to a focal length of the zoom lens, and the controller may change the optimum location error information according to the information of the focal length.

The optimum location error information may vary according to the location of the focus lens, and the controller may change the optimum location error information according to the information of the location of the focus lens.

The optimum location error information may vary according the information of the photographing aperture, and the controller may convert the optimum location error information according to the information of the photographing aperture.

An error of the optimum location may be represented by an equation of higher degree, and the storage unit may store coefficients of the equation of higher degree as the optimum location error information.

The equation of higher degree may be a function of the optimum location and a focus deviation amount.

The equation of higher degree may be a function of the optimum location and a driving amount of the focus lens.

Each of the replaceable lens and the body unit may include a communication pin for transmitting data.

The AF adjusting apparatus may further include a focus detection region setting unit configured to set a target region on which a focal point is to be detected, from among a plurality of focus detection regions, wherein the storage unit is configured to store the optimum location error information that varies according to a location of the set target region.

The optimum location error information may vary according to a distance from the optical axis to the set target region.

The controller may obtain the optimum location error information according to a location of the set target region.

According to another aspect of the invention, there is provided an auto focus (AF) adjusting apparatus including an imaging sensor for capturing light transmitted through an imaging lens to generate an image signal; an AF estimation value calculating unit for calculating an AF estimation value with respect to a first frequency band by using the image signal; a focus lens driver for driving a focus lens of the imaging lens; a location detector for detecting a location of the focus lens; an optimum location calculating unit for calculating an optimum location of the AF estimation value by using the location of the focus lens and the AF estimation value; a controller for controlling the focus lens to move to the optimum location; and a storage unit for storing optimum location error information occurring due to a difference between a second frequency band for determining an optimum location of an image surface of the imaging lens and the first frequency band, wherein the AF adjusting apparatus obtains optimum location error information with respect to the optimum location of the image surface of the imaging lens, and corrects the optimum location by using the optimum location error information, and when a difference between the first frequency band and the second frequency band is equal to or less than a reference, the controller drives the focus lens to move the optimum location obtained using the optimum location error information.

The controller may include a comparison unit for comparing the difference between the first frequency band and the second frequency band with the reference; and a determination unit for determining whether error correction is to be performed according to the comparison result.

According to another aspect of the invention, there is provided a camera system including a replaceable lens and a body unit in which the replaceable lens is installed, wherein the replaceable lens includes an imaging lens including a zoom lens and a focus lens; a driver for driving the focus lens; a location detector for detecting a location of the focus lens; and a storage unit for storing optimum location error information occurring due to a difference between a first frequency band for determining an optimum location of an image surface of the imaging lens and a second frequency band for performing AF detection, and the body unit includes an imaging sensor for generating an image signal; an auto focus (AF) estimation value calculating unit for calculating an AF estimation value with respect to the second frequency band by using the image signal; an optimum location calculating unit for calculating an optimum location of the AF estimation value; and a controller for driving the focus lens according to the optimum location of the AF estimation value, and the replaceable lens transmits information of the imaging lens to the body unit.

The controller may receive the optimum location error information from the replaceable lens, corrects an optimum location of the AF estimation value according to the received optimum location error information, and may control the focus lens to move to the corrected optimum location.

The controller may receive the optimum location error information from the replaceable lens, may correct the optimum location of the AF estimation value according to the received optimum location error information, and may transmit information for driving the focus lens to move the corrected optimum location to the replaceable lens.

The body unit may further include a frequency comparison unit for comparing a difference between the first frequency band and the second frequency band with a reference, and the controller may control the focus lens to move to the optimum location of the AF estimation value calculated in the optimum location calculating unit, when the difference between the first frequency band and the second frequency band is smaller than the reference.

The body unit may further include a frequency comparison unit for comparing a difference between the first frequency band and the second frequency band with a reference, and the controller may receive the optimum location error information from the replaceable lens, corrects an optimum location of the AF estimation value according to the received optimum location error information, and controls the focus lens to move to the corrected optimum location, when the difference between the first frequency band and the second frequency band is greater than the reference.

According to another aspect of the invention, there is provided a camera system including a replaceable lens and a body unit in which the replaceable lens is installed, wherein the replaceable lens includes an imaging lens including a zoom lens and a focus lens, for determining an optimum location of an image surface in a first frequency band; a driver for driving the focus lens; and a first storage unit for storing information of a type of lens, including information of the first frequency band, and the body unit includes an imaging sensor for generating an image signal; an auto focus (AF) estimation value calculating unit for calculating an AF estimation value with respect to the second frequency band by using the image signal; an optimum location calculating unit for calculating an optimum location of the AF estimation value by using the AF estimation value; a controller for driving the focus lens according to the optimum location of the AF estimation value, and a second storage unit for storing optimum location error information occurring due to a difference between the first frequency band and the second frequency band for each type of lens, and the replaceable lens transmits the information of the type of lens of the imaging lens to the body unit.

The controller may select optimum location error information corresponding to an optimum location of the AF estimation value from among various pieces of optimum location error information corresponding to the type of lens of the imaging lens, and may correct the optimum location of the AF estimation value by using the selected optimum location error information.

The body unit may further include a frequency comparison unit for comparing a difference between the first frequency band and the second frequency band with a reference, and the controller may control the focus lens to move to the optimum location of the AF estimation value calculated in the optimum location calculating unit, when the difference between the first frequency band and the second frequency band is smaller than the reference.

The body unit may further include a frequency comparison unit for comparing a difference between the first frequency band and the second frequency band with a reference, and the controller may receive the optimum location error information from the replaceable lens, corrects the optimum location of the AF estimation value according to the received optimum location error information, and controls the focus lens to move to the corrected optimum location, when the difference between the first frequency band and the second frequency band is greater than the reference.

BRIEF DESCRIPTION OF THE DRAWINGS

The above and other features and advantages of the invention will become more apparent by describing in detail exemplary embodiments thereof with reference to the attached drawings in which:

FIG. 13 shows optimum location error information, according to another embodiment of the invention;

FIG. 16 is a table showing optimum location error information, according to another embodiment of the invention;

DETAILED DESCRIPTION

Hereinafter, the invention will be described in detail by explaining exemplary embodiments thereof with reference to the attached drawings.

Optimum Location of Image Surface of Imaging Lens (Best Image Surface)

Modulation transfer function (MTF) characteristic is one factor among the factors for determining the performance of an imaging lens, and refers to the spreading characteristics of a lens. When a lens is designed, the MTF characteristics and a resolving power are important, and the MTF characteristics are factors that affect an image contrast. A lens is designed in such a way that the resolution of an image may be high when the image is in focus. A frequency band used for evaluating the quality of an image may be from 40 to 100 line pair (hereinafter referred to as "lp")/mm, and often from 40 to 50 lp/mm.

On the other hand, a frequency band for performing auto focusing (AF) is dependent upon the performance of an imaging sensor or digital signal processor (DSP), and may be from about 5 to about 20 lp/mm. The reason using a frequency band from 5 to 20 lp/mm is that an image signal used for adjusting AF is the same as an image signal used for a live view image and the resolution of the live view image corresponds to a video graphic array (VGA) or a super video graphic array (SVGA) even when the live view image is displayed on a precision display apparatus. The resolution of the live view image is related to an image signal-outputting speed of the image sensor or a signal processing speed of the DSP. It is difficult to output the live view image having the same resolution as in a case when a still image is captured. That is, the frequency band for performing the AF detection is not the same as in a case when the still image is captured.

An AF detection circuit is formed by combining a high pass filter and a low pass filter, and performs AF detection with respect to an image signal of a predetermined frequency band, passing through the high pass filter and the low pass filter. In this case, only signals of a high frequency band may be input to the AF detection circuit by adjusting a cut-off frequency of the high pass filter. However, since a high frequency band is limited in the image sensor or the DSP, an amount of information used for the AF detection is reduced, and thus AF detection performance is reduced.

Figure 1A:
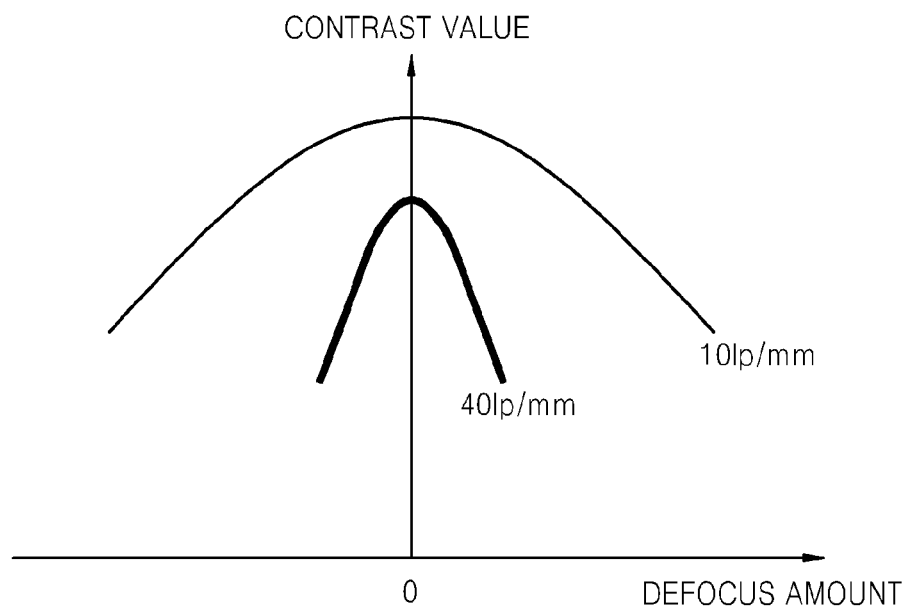
FIG. 1A is a graph for showing ideal modulation transfer function (MTF) of an imaging lens, according to an embodiment of the invention.

FIG. 1A is a graph for showing ideal MTF characteristics of an imaging lens, according to an embodiment of the invention. In the graph of FIG. 1A, a horizontal axis indicates a focal point location (defocus amount), and a vertical axis indicates a contrast value. In the current embodiment, a representative frequency band for determining an optimum location of an image surface is 40 lp/mm, and a frequency band for performing the AF detection is 10 lp/mm.

In order to correctly adjust a focal point, a peak position of a contrast value at 10 lp/mm matches a peak position of a contrast value at 40 lp/mm, which is the design goal of the imaging lens, as shown in FIG. 1A. This is an ideal case. Actually, when a complex lens such as a zoom lens is designed, the peak positions may not be matched each other. However, although the frequency band for determining the optimum location of the image surface of the imaging lens is 40 lp/mm, and the frequency band for performing the AF detection is 10 lp/mm, the imaging lens is designed so as to correctly detect an optimum location of a focus lens.

Figure 1B:
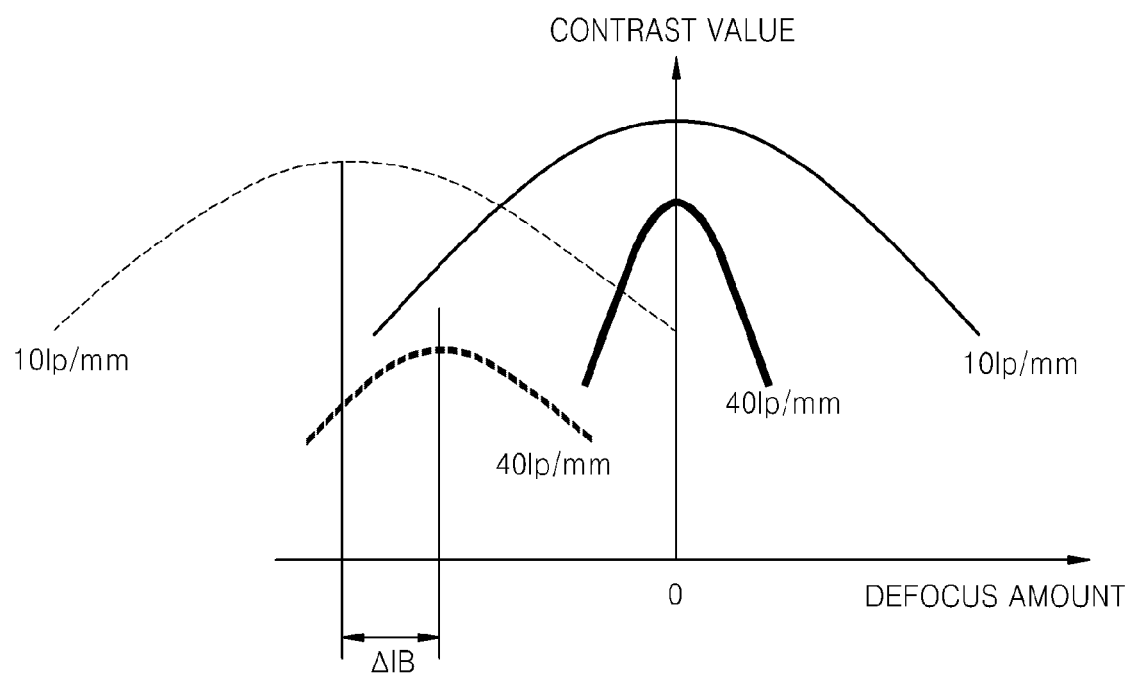
FIG. 1B is a graph for showing ideal MTF characteristics of an imaging lens in which manufacturing errors occur.

FIG. 1B is a graph for showing ideal MTF characteristics of an imaging lens in which manufacturing errors occur. In FIG. 1B, solid lines indicate plots for the MTF characteristics of the imaging lens of FIG. 1A, and dotted lines indicate plots for the MTF characteristics of the imaging lens in which manufacturing errors occur.

Even though the imaging device is designed in such a way that peak positions match each other regardless of a frequency band, the peak positions may not match each other due to the manufacturing errors of the image device. In addition, depending on cases, mismatch may occur when a lens is designed, like in the manufacturing errors. Referring to FIG. 1B, a difference in the peak positions of the contrast values between 40 lp/mm as a frequency band for determining the optimum location of the image surface and 10 lp/mm as a frequency band for performing the AF detection is EIB. When the error AIB is greater than a depth of field, correct AF is not performed, thereby capturing an image whose quality is not good.

Although not illustrated in FIGS. 1A and 1B, when the optimum focal point locations of 40 lp/mm and 10 lp/mm are not the same, the sum of manufacturing errors and designing errors that already occur is denoted EIB.

Figure 1C:
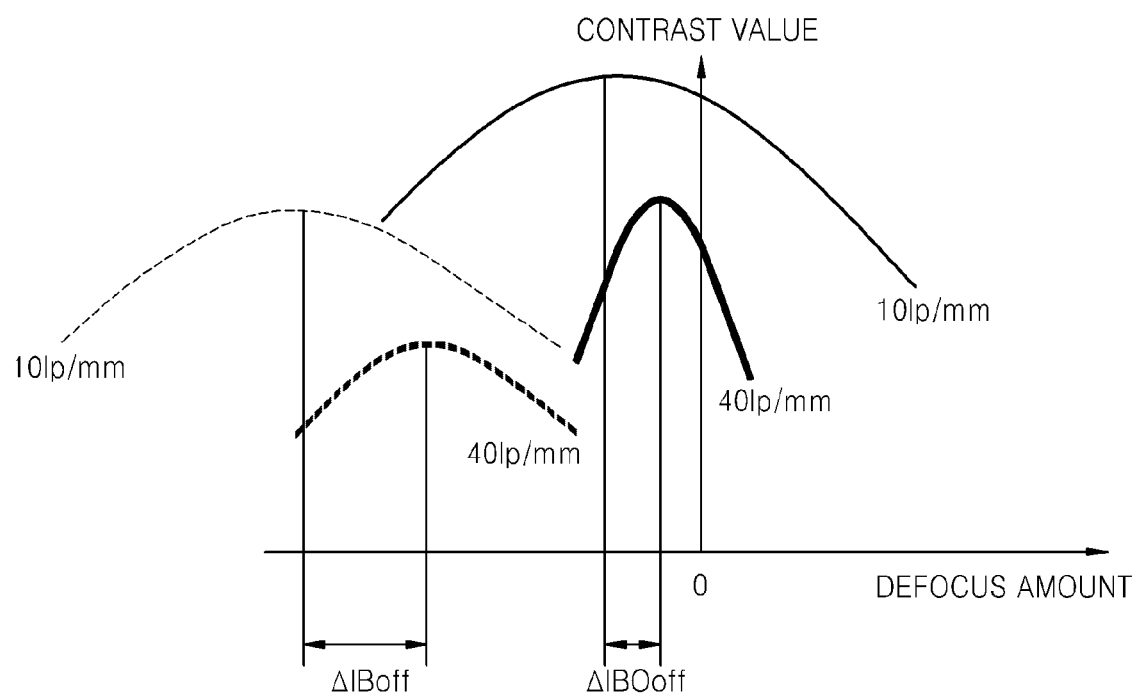
FIG. 1C is a graph for showing MTF characteristics according to an image height.

FIG. 1C is a graph for showing MTF characteristics according to an image height. The image height refers to a distance between an image of a subject and an optical axis. That is, FIG. 1C shows MTF characteristics outside the optical axis. Since a spherical aberration exists in a lens, an optimum location of an image surface on the optical axis is different from and an optimum location of an image surface outside the optical axis. The difference in an optimum location of an image surface is also caused by a difference in a frequency band. The difference in an optimum location of an image surface is increased when an AF detection region is outside the optical axis. In addition, due to manufacturing errors of an imaging lens, the difference in an optimum location of an image surface is further increased. Referring to FIG. 1C, the difference in an optimum location of an image surface due to the difference in a frequency band is indicated by $\Delta IB0off$, and the difference in an optimum location of an image surface due to the difference in a frequency band and the manufacturing errors. FIG. 1C shows errors at a predetermined image height, but $\Delta IBoff$ may vary according to an image height.

According to embodiments of the invention, an AF operation is performed by performing correction in order to correct the above error $\Delta IB$, or $\Delta IBoff$ when it is required.

Hereinafter, various embodiments of the invention will be described.

First Embodiment

First Embodiment of Configuration of Camera System

Figure 2:
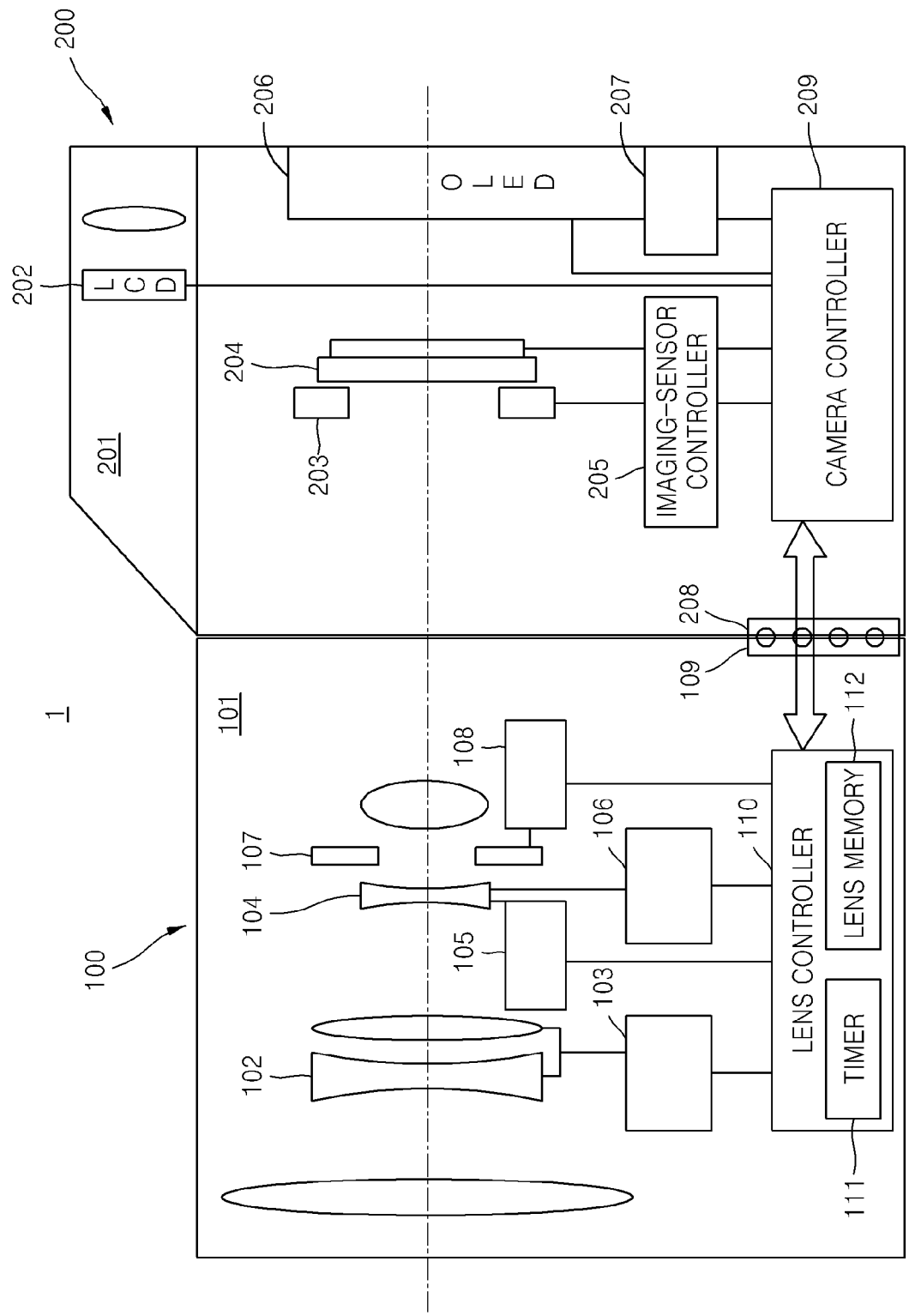
FIG. 2 is a diagram of a camera system according to an embodiment of the invention.

FIG. 2 is a diagram of a camera system 1 according to an embodiment of the invention.

Referring to FIG. 2, the camera system 1 includes a replaceable lens 100 (hereinafter, referred to as the 'lens') and a body unit 200.

The lens 100 includes an imaging optical system 101, a zoom lens location detecting sensor 103, a lens driving actuator 105, a focus lens location detecting sensor 106, an aperture driving actuator 108, a lens controller 110, and a lens mount 109.

The imaging optical system 101 includes a zoom lens 102 for performing a zooming operation, a focus lens 104 for changing a focal point location, and an aperture 107. The zoom lens 102 and the focus lens 104 may each be configured as a lens group including a plurality of lenses. Hereinafter, the zoom lens 102 and the focus lens 104 will be referred to as an imaging lens. The zoom lens location detecting sensor 103 and the focus lens location detecting sensor 106 detect a location of the zoom lens 102 and a location of the focus lens 104, respectively. A focal length of zoom lens 102 is changed by manipulating a zoom ring, and in order to detect the focal length, the zoom lens location detecting sensor 103 includes a combination of a brush and an encoder plate. When the zoom ring rotates, the brush or the encoder plate rotates, and a code is changed to correspond to the rotation position, thereby detecting the focal length. It is possible to change a peculiar parameter of the lens 100 for each focal length. For example, the focal length of the zoom lens 102 may be divided into 32 portions. In addition, if the focal length needs to be divided in more detail, a volume-type encoder is used. The volume-type encoder includes a resistance portion and a rotation-type brush. When the zoom ring rotates, the rotation-type brush rotates, and the focal length may be finely detected by a resistance change between the resistance portion and the rotation-type brush. When the focal length is detected, analog/digital (AD) conversion is performed with respect to a voltage. In this case, when the AD conversion is performed to have 12 bits, the focal length is divided into 4096 portions. Any one or all of the encoders may be installed in a camera. When a direct current (DC) motor is used as the lens driving actuator 105, the focus lens location detecting sensor 106 includes a photo interrupter and an encoder plate. The lens driving actuator 105 transfer a power through a gear train and a driving axis. When the lens driving actuator 105 rotates, the encoder plate rotates. Then, when an encoder wing installed inside the photo interrupter passes or does not pass light of the photo interrupter, a pulse is generated, and the pulse functions as a location signal. In addition, when a stepping motor is used as the lens driving actuator 105, a driving step pulse may be used to detect a location.

Timing for detecting a location of the focus lens 104 may be set by a lens controller 110 or a camera controller 209 that will be described. For example, the timing for detecting the location of the focus lens 104 may be timing for performing the AF detection on an image signal. The focus lens location detecting sensor 106 may be an example of a location detector.

The lens driving actuator 105 and the aperture driving actuator 108 are controlled by the lens controller 110 so as to drive the focus lens 104 and the aperture 107, respectively. In particular, the lens driving actuator 105 drives the focus lens 104 along an optical axis. The lens driving actuator 105 may be an example of a driver of the focus lens 104.

A lens controller 110 includes a timer 111 for measuring a point of time, and a lens memory 112. In addition, the lens controller 110 transmits location information corresponding to the location of the focus lens 104 to the body unit 200.

The lens memory 112 may be an example of a storage unit for storing optimum location error information. The optimum location error information refers to information indicating errors of the optimum location that occur due to the difference between the frequency band for performing the AF detection and the frequency band for determining the optimum location of the image surface of the imaging lens. The optimum location error information varies according to a focal length, a photographing distance, a photographing aperture value, and so on.

The lens mount 109 includes a communication pin of a lens side that functions as a transmission channel of data, control signals, and so on, together with a communication pin of a camera side that will be described later.

Next, configuration of the body unit 200 will be described.

The body unit 200 may include an electronic view finder (EVF) 201, a shutter 203, an imaging sensor 204, an imaging-sensor controller 205, a display unit 206, manipulation buttons 207, the camera controller 209, and a camera mount 208.

The EVF 201 may include a liquid crystal display (LCD) unit 202. Thus, via the EVF 201, a user may view an image that is being captured, in real time.

The shutter 203 determines a period of time that light is applied to the imaging sensor 204, that is, an exposure time.

The imaging sensor 204 captures image light transmitted through the imaging optical system 101 of the lens 100 to generate an image signal. The imaging sensor 204 may include a plurality of photoelectric transformation units that are arranged in a matrix formation, and a vertical and/or horizontal transmission channel for moving electric charges and reading the image signal from the photoelectric transformation units. A charge coupled device (CCD) sensor or a complementary metal oxide semiconductor (CMOS) sensor may be used as the imaging sensor 204.

The imaging-sensor controller 205 generates a timing signal, and controls the imaging sensor 204 so as to capture an image in synchronization with the timing signal. In addition, the imaging-sensor controller 205 controls the imaging sensor 204 so as to sequentially read horizontal image signals when charge accumulation is finished in every scanning line. The horizontal image signals are used in the AF detection of the camera controller 209.

The display unit 206 is for displaying various images and various pieces of information. An organic light-emitting device (OLED) or a liquid crystal display device (LCD) may be used as the display unit 206.

The manipulation buttons 207 input various user commands in order to manipulate the camera system 1. The manipulation buttons 207 may include various buttons such as a shutter release button, a main switch, a mode dial and a menu button.

The camera controller 209 performs AF detection on the image signal generated by the imaging sensor 204 to calculate an AF estimation value. In addition, the camera controller 209 stores the AF estimation value for each of respective AF detection time according to the timing signal generated by the imaging-sensor controller 205, and calculates an optimum location of the focus lens 104, that is, a focal point location by using the location information transmitted from the lens 100 and the stored AF estimation value for each of the AF detection time. The result of the calculation of the optimum location is transmitted to the lens 100. That is, the camera controller 209 may be an example of a set of an AF estimation value calculating unit and an optimum location calculating unit.

In multi-division AF detection in which a capture image is divided into a plurality of regions, and AF detection is performed on at least one of the regions, an AF detection region that is a target region of AF detection may be set by an automatic selection of the camera controller 209 or a user's selection.

The AF detection region is automatically selected by the camera system 1 by using various methods such as 1) a method including detecting a focal point of each subject in 15 regions and selecting a subject that is closest to the camera system 1, 2) a method of first selecting a center, 3) a method of selecting a region with a highest contrast value, or 4) a method of combining these methods. In addition, the AF detection region is selected by the user by using a method of selecting at least one region from among the 15 regions. That is, the camera controller 209 may be an example of a focus detection region setting unit.

The camera controller 209 compares the frequency band for determining the optimum location of the image surface of the imaging lens with the frequency band for performing the AF detection, and determines whether error correction is to be performed. That is, the camera controller 209 may be an example of a set of a comparison unit and a determination unit.

The camera mount 208 includes a communication pin of a camera side.

Hereinafter, schematic operations of the lens 100 and the body unit 200 will be described.

When a subject is to be photographed, operating of the camera system 1 is started by manipulating the main switch of the manipulation buttons 207. First, the camera system 1 performs live-view display as follows.

Image light from the subject transmitted through the imaging optical system 101 is incident on the imaging sensor 204. In this case, the shutter 203 is in an open state. The incident image light is converted into an electrical signal by the imaging sensor 204, thereby generating an image signal. The imaging sensor 204 operates according to the timing signal generated by the imaging-sensor controller 205. The generated image signal is converted into data that is capable of being displayed by the camera controller 209, and is output to the EVF 201 and the display unit 206. This operation is the live-view display, and live-view images displayed during the live-view display are consecutively displayed as a moving picture.

While the live-view images are displayed, the camera system 1 starts an AF operation when the shutter release button of the manipulation buttons 207 is pressed halfway. The AF operation is performed using the image signal generated by the imaging sensor 204. In a contrast AF method, the optimum location of the focus lens 104 is calculated from the AF estimation value calculated by the camera controller 209, which is related to a contrast value, and the lens 100 is driven based on the result of the calculation. The camera controller 209 calculates information for controlling the focus lens 104 from the AF estimation value, and transmits the information to the lens controller 110 via the communication pin of the lens mount 109 and the communication pin of the camera mount 208.

The lens controller 110 controls the lens driving actuator 105, based on the received information, and drives the focus lens 104 along the optical axis so as to perform the AF operation. The focus lens location detecting sensor 106 monitors the location of the focus lens 104 so as to perform feedback control on the location of the focus lens 104.

When the zoom lens 102 is zoomed by user's manipulation, the zoom lens location detecting sensor 103 detects the location of the zoom lens 102, and the lens controller 110 changes AF control parameters of the focus lens 104 to perform the AF operation again.

When a subject image is in complete focus by the above-described operation, the shutter release button of the manipulation buttons 207 is pressed fully (S2 operation) so that the camera system 1 performs an exposure operation. In this case, the camera controller 209 closes the shutter 203 completely, and transmits photometry information as aperture control information to the lens controller 110, wherein the photometry information has been obtained so far. The lens controller 110 controls the aperture driving actuator 108, based on the aperture control information, and the aperture 107 is narrowed according to an appropriate photographing aperture value. The camera controller 209 controls the shutter 203 according to the photometry information, and opens the shutter 203 for an appropriate exposure time so as to photograph the subject and capture the subject image.

An image signal process and a compression process are performed on the captured subject image, and the processed subject image is stored in a memory card. The captured subject image is output on the EVF 201 and the displaying unit 206. The subject image displayed on the EVF 201 and the display unit 206 may be referred to as a quick view image.

A series of photograph operations is completed by the above-described operations.

[Configuration and Operation of Camera Controller]

Figure 3:
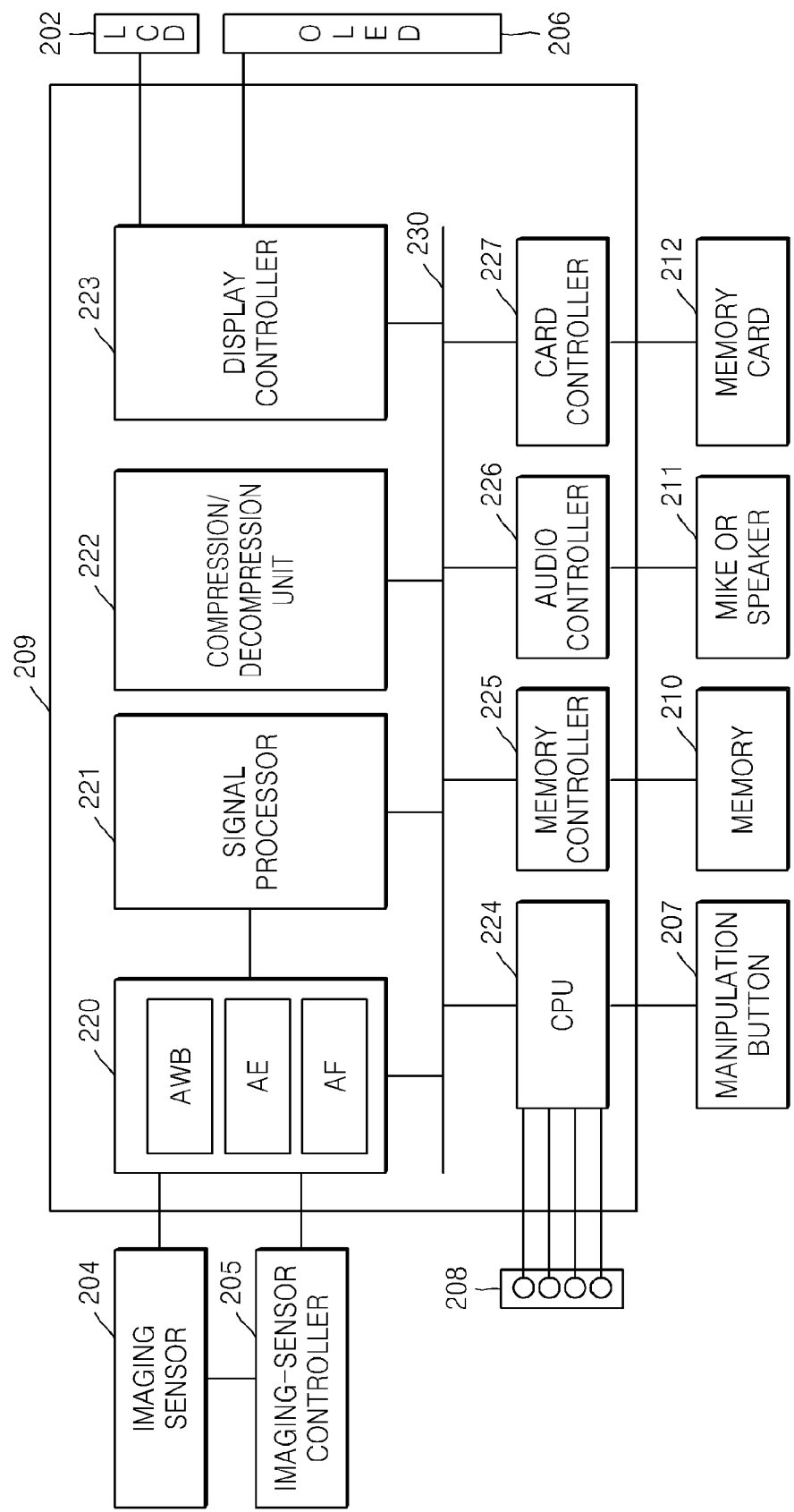
FIG. 3 shows the camera controller, according to an embodiment of the invention.

FIG. 3 shows the camera controller 209, according to an embodiment of the invention.

Referring to FIG. 3, the camera controller 209 includes a preprocessor 220, a signal processor 221, a compression/decompression unit 222, a display controller 223, a central processing unit (CPU) 224, a memory controller 225, an audio controller 226, a card controller 227, and a main bus 230.

The camera controller 209 transmits various commands and various pieces of data to each of elements via the main bus 230.

The preprocessor 220 receives an image signal generated by the imaging sensor 204 and performs auto white balance (AWB), auto exposure (AE) and AF calculations. That is, the preprocessor 220 calculates the AF estimation value for adjusting AF, an AE estimation value for adjusting exposure, and an AWB estimation value for adjusting white balance.

The signal processor 221 creates a live-view image or a captured image that is capable of being displayed on the display unit 206 by performing a series of image signal processing operations such as gamma correction.

The compression/decompression unit 222 performs compression and decompression on the processed image signal. In a case of compression, the image signal is compressed according to a compression format, for example, JPEG or H.264. An image file including image data generated by the compression is transmitted to and stored in a memory card 212.

The display controller 223 controls the LCD 202 of the EVF 201 and a display screen of the display unit 206 so as to output images on the LCD 202 and the display screen.

The CPU 224 controls overall operations. In addition, in a case of the camera system 1 of FIG. 1, the CPU 224 communicates with the lens 100.

The memory controller 225 controls a memory 210 for temporally storing data such as a captured image or operation information, and controls a mike or speaker 211. The card controller 227 controls the memory card 212 in which the captured image may be stored.

Hereinafter, a schematic operation of the camera controller 209 will be described.

When the CPU 224 detects that the manipulation buttons 207 are manipulated, the CPU 224 operates the imaging-sensor controller 205 through the preprocessor 220. The imaging-sensor controller 205 outputs a timing signal so as to operate the imaging sensor 204. When an image signal is input to the preprocessor 220 from the imaging sensor 204, the AWB and AE calculations are performed. The results of the AWB and AE calculations are transmitted to the imaging-sensor controller 205 as feedback so that an image signal corresponding to appropriate color output and appropriate exposure may be obtained from the imaging sensor 204.

When the camera system 1 begins to operate, the live-view display described above is performed. The camera controller 209 inputs the image signal corresponding to appropriate exposure to the preprocessor 220 so as to calculate the AE estimation value, or the like. An image signal for the live-view display is applied directly to the signal processor 221 without passing through the main bus 230. An image signal process such as pixel interpolation is performed on the image signal. The processed image signal is transmitted through the main bus 230 and the display controller 223 to be displayed on the LCD 202 and the display unit 206. The live-view display is updated at a period of 60 frames per second (fps), but the invention is not limited thereto. That is, the live-view display may be updated at a period of 120 fps, 180 fps or 240 fps. This updating period is set by the CPU 224 according to photometry information or AF conditions. In addition, the updating may be performed by changing the timing signal output by the imaging-sensor controller 205.

When the shutter release button is pressed halfway (S1 operation), the CPU 224 detects input of a half-press signal, and instructs the lens controller 110 to start driving of the focus lens 104 in order to perform an AF operation via the communication pin of the camera mount 208 and the communication pin of the lens mount 109.

The CPU 224 obtains the image signal from the imaging sensor 204. The preprocessor 220 calculates the AF estimation value. The AF estimation value is calculated according to movement of the focus lens 104. A location of the focus lens 104 in which the AF estimation value is maximized, that is, in which contrast of the subject image is maximized, is calculated from changes in the AF estimation value, and the focus lens 104 is moved to the calculated location. This series of operations is an AF operation, and the live-view display is continuously performed during the AF operation. The image signal used for the live-view display is the same as an image signal used to calculate the AF estimation value.

In a case of the camera system 1 using the lens 100 of FIG. 1, during the AF operation, the communication pin of the camera mount 208 and the communication pin of the lens mount 109 are used in communications between the lens 100 and the body unit 200

[Detection of Peak Value]

Hereinafter, a method of detecting a peak value of an AF estimation value during the AF operation will be described.

Figure 4:
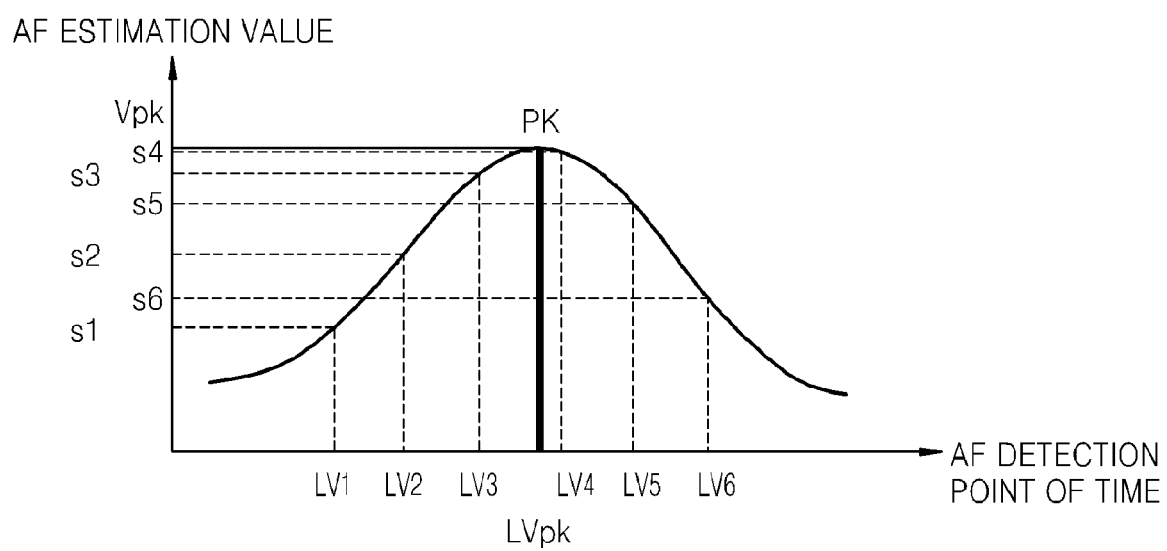
FIG. 4 is a graph for explaining detection of a peak value of an auto focus (AF) estimation value in a contrast AF method.

FIG. 4 is a graph for explaining detection of a peak value of the AF estimation value in a contrast AF method. In FIG. 4, a horizontal axis indicates an AF detection point of time, and a vertical axis indicates the AF estimation value. The AF detection point of time refers to an intermediate point of time of the charge accumulation times from a starting point of time to a finishing point of time, in an AF region of the imaging sensor 204.

Since the AF estimation values are discrete, an actual peak location may be detected by performing interpolation calculation on the AF estimation values. The actual peak location corresponds to an AF detection point of time LVpk and an actual peak value thereof is an AF estimation value Vpk, and location and value thereof correspond to a point PK. The interpolation calculation used to detect the peak value may be performed using three pieces of data, for example, LV3, LV4 and LV5, and AF estimation values s3, s4 and s5 corresponding to LV3, LV4 and LV5, respectively.

When the peak value of the AF estimation value is calculated, an AF detection point of time is determined at timing having the peak value. A location of the focus lens 104 at timing synchronized with the determined AF detection point, that is, an optimum location of the focus lens 104 is detected. By detecting the optimum location of the focus lens 104, the focus lens 104 may be driven to move to a target location that is a focal point location.

[Controlling Method of Camera System]

Figure 5A:
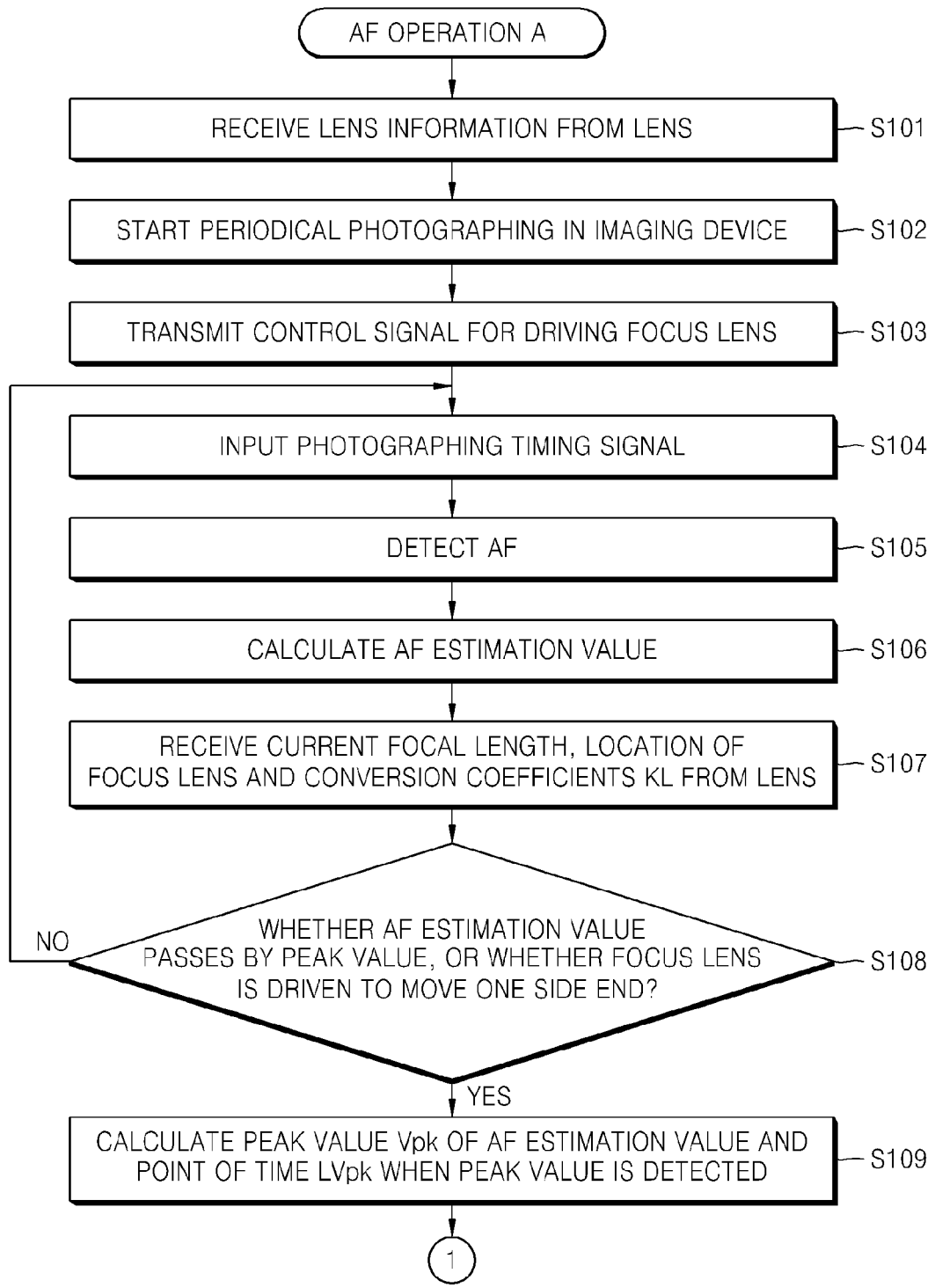
FIGS. 5A and 5B are flowcharts of a controlling method of the camera system 1 of FIG. 2, according to an embodiment of the invention.
Figure 5B:
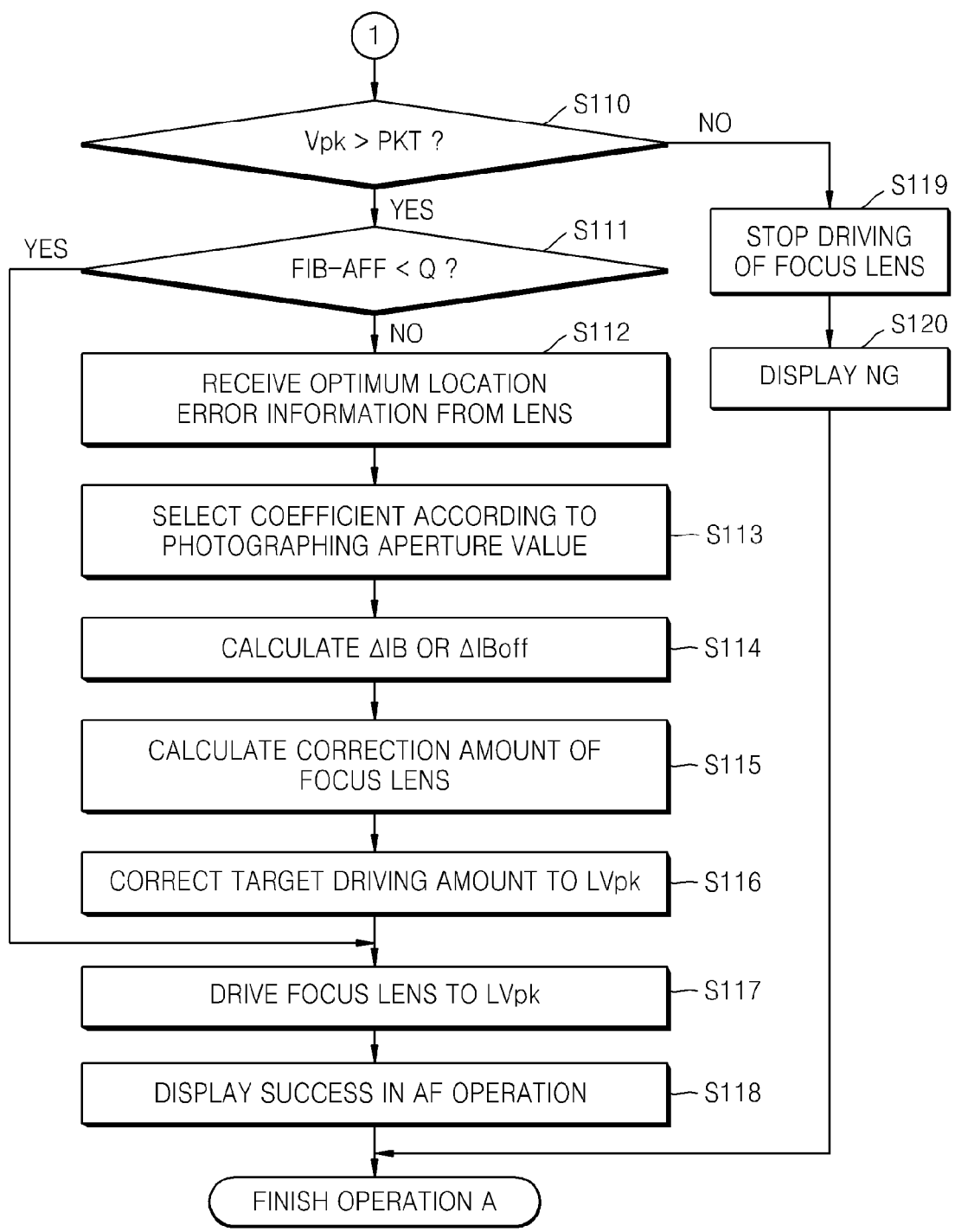

FIGS. 5A and 5B are flowcharts of a controlling method of the camera system 1 of FIG. 2, according to an embodiment of the invention.

When power is supplied to the camera system 1, and the shutter release button is pressed halfway, an AF operation 'A' is started. When the AF operation 'A' is started, the camera controller 209 receives lens information from the lens 100 (operation S101). The lens information includes various peculiar parameters of lenses, and is stored in the lens memory 112. The lens information includes information regarding a frequency band 'FIB' for determining an optimum location of an image surface of the imaging lens. The imaging sensor 204 periodically captures an image to generate an image signal (operation S102). The camera controller 209 transmits a control signal for driving the focus lens 104 to the lens 100 (operation S103). According to the control signal, the focus lens 104 is controlled to move from one side to the other side.

When the focus lens 104 starts to be driven, a photographing timing signal is input to the CPU 224 (operation S104). The photographing timing signal refers to a signal indicating timing when the AF detection is started. The photographing timing signal is generated to correspond to an AF detection region that is previously set. The CPU 224 counts driving signals generated from the imaging-sensor controller 205.

The CPU 224 determines the timing when the number of the counted driving signals reaches a predetermined number as the timing when the AF detection is started.

When the photographing timing signal is input, the AF detection is performed by inputting an image signal of the AF detection region to the AF detection circuit of the preprocessor 220 included in the camera controller 209 from the imaging sensor 204 (operation S105). The AF estimation values are calculated by performing the AF detection (operation S106). In addition, information regarding the current focal length, information regarding a location of the focus lens 104 at AF detection timing, and conversion coefficients KL of the current driving amount of the focus lens 104 and focus deviation amount are obtained from the lens 100. The information regarding the current focal length, the information regarding the location of the focus lens 104 at the AF detection timing, and conversion coefficients KL are stored together with the AF estimation values, wherein these pieces of information constitute a set (operation S107).

A central frequency of a frequency band for performing the AF detection will be referred to as 'AFF'. The AFF may be fixed by the camera system 1, may vary according to an operation mode of the camera system 1 or conditions of a subject, or may include a plurality of frequencies. According to the embodiment, the AFF is determined according to predetermined conditions.

It is determined whether the AF estimation value passes by the peak value, or whether the focus lens 104 is driven to move to one side end (operation S108). A method of determining whether the AF estimation value passes by the peak value will now be described. It is assumed that an initial value of the AF estimation is an imaginary peak value. When a new AF estimation value that is newly calculated according to driving of the focus lens 104 is greater than the imaginary value, the new AF estimation value is changed to an imaginary peak value. On the other hand, when the imaginary peak value is smaller than the new AF estimation value, it is determined that the peak value exists in the AF estimation values calculated during the AF detection. When the focus lens 104 is not driven to move to one side end, and the peak value is not detected, the method returns back to operation S104 to continue to calculate AF estimation values.

When the peak value exists in the AF estimation values, or the focus lens 104 is driven to move to one side end, an actual peak Vpk and a point of time LVpk when the peak value is detected are calculated (operation S109). Since the AF estimation is not always the peak value at timing when the AF estimation is calculated, the peak value may be obtained by performing interpolation calculation on the AF estimation values, as described with reference to FIG. 4. On the other hand, when the focus lens 104 is driven to move to one side end, and operation S109 is started, the AF estimation value uses a temporary peak value that is estimated.

Then, it is determined whether the actual peak value Vpk of the AF estimation value is greater than a reference value PKT (operation S110). When it is determined that the actual peak value Vpk is greater than the reference value PKT, it is determined that it is possible to adjust AF. The central frequency AFF of the frequency band for performing the AF detection is compared with the frequency band FIB for determining the optimum location of the image surface of the imaging lens, and then it is determined whether the difference between the AFF and the FIB is smaller than a reference Q (operation S111). When the difference between the AFF and the FIB is greater than the reference Q, errors $\Delta IB$ occurs, as shown in FIG. 1B, and thus the errors $\Delta IB$ need to be corrected. However, when the difference between the AFF and the FIB is smaller than the reference Q, errors may be negligible. Accordingly, when the difference between the AFF and the FIB is greater than the reference Q, the optimum location error information is obtained from the lens 100 in order to correct the errors $\Delta IB$ (operation S112).

The optimum location error information will now be described.

(When the AF detection region is located in the center of the image sensor)

As described with reference to FIGS. 1A and 1B, the optimum location error information refers to a correction value of the optimum location that occur due to the difference between the frequency band for performing the AF detection and the frequency band for determining the optimum location of the image surface of the imaging lens. The optimum location error information corresponds to the error $\Delta IB$ of FIG. 1B which can be represented by a coefficient of equation of a high degree, and varies according to conditions of the lens 100. That is, the error $\Delta IB$ is affected by a focal length, a photographing distance, a photographing aperture value, a location of the AF detection region, a resolving power direction (i.e., a meridional direction, and a sagittal direction), and so on. With regard to the location of the AF detection region, and the resolving power direction, when the AF detection region is located in the center of the imagining sensor, correction is not required.

When the AF detection region is located in the center of the imagining sensor, the correction is performed to correspond to changes in a focal length, a photographing distance and a photographing aperture value. However, since the error $\Delta IB$ does not show a linear change, the error $\Delta IB$ may be represented by an equation of higher degree, for example, $\Delta IB = Ax^5 + Bx^4 + Cx^3 + Dx^2 + Ex + F$, where x is a reciprocal of a distance. A, B, C, D, E and F vary according to the focal length. In addition, the correction is performed to correspond to a change in coefficients due to the photographing aperture value by using a plurality of pieces of optimum location error information, such as $\Delta IB1$, $\Delta IB2$, $\Delta IB3$, etc., wherein the pieces of optimum location error information constitute a set. For example, $\Delta IB1$ corresponds to a case where the aperture is open, $\Delta IB2$ corresponds to a case where the aperture is narrowed in a first step, and $\Delta IB3$ corresponds to a case where the aperture is narrowed in a second step. However, since $\Delta IB1$, $\Delta IB2$, $\Delta IB3$, and $\Delta IB4$ due to the photographing aperture value meets $\Delta IB1 \approx 2\Delta IB2 \approx 4\Delta IB3 \approx 8\Delta IB4$, only $\Delta IB1$ is stored instead of storing all of $\Delta IB1$, $\Delta IB2$, $\Delta IB3$ and $\Delta IB4$. Then, the remaining values may be calculated in the camera system 1. The optimum location error information may be represented by a table showing calculation results of the error $\Delta IB$ according to the focal length, the photographing distance, and the photographing aperture value. That is, the calculation results of the equation of higher degree may be represented in the form of table.

Figure 6:
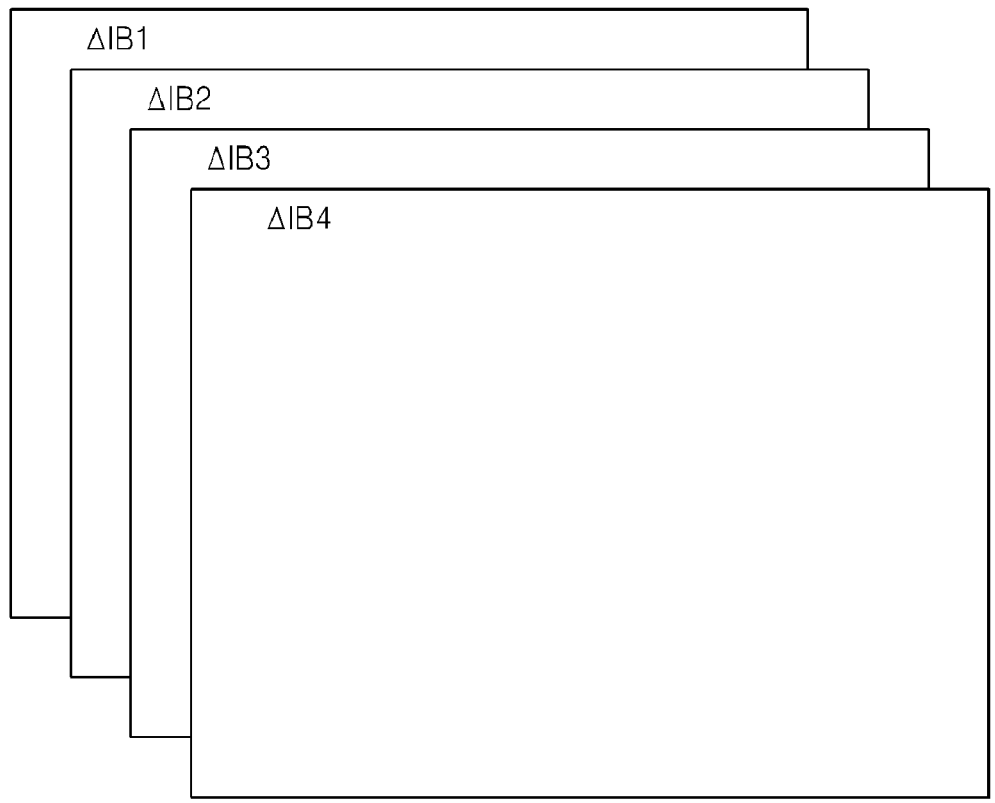
FIG. 6 shows optimum location error information, according to an embodiment of the invention.

Since the error $\Delta IB$ varies according to the current conditions, the error $\Delta IB$ may be calculated based on the latest information regarding a situation of the imaging lens. Thus, the error $\Delta IB$ is calculated in consideration of a focal length, a location of the focus lens 104 (a photographing distance) and a photographing aperture value, at a point of time when the peak value of the AF estimation value is detected. That is, the correction is performed with respect to the point of time LVpk when the peak value of AF estimation value is detected FIG. 6 shows optimum location error information, according to an embodiment of the invention. As shown in FIG. 6, coefficients of an equation of higher degree may be stored in the form of table. In FIG. 6, a vertical direction indicates a change in focal length, and a horizontal axis indicates coefficients of each degree of the equation of higher degree. The number of data is determined according to the number of divisions of an encoder for detecting a location of a zoom lens. As described above, values of the table vary according to the photographing aperture value, and thus the same number of tables as the number of photographing aperture values are prepared and stored in the lens memory 112.

The optimum location error information obtained in operation S112 corresponds to a focal length when the optimum location error information is transmitted. For example, when the focal length is $6^{th}$, a6, b6, c6, d6, e6 and f6 are transmitted to the body unit 200. In this case, since a6, b6, c6, d6, e6 and f6 vary according to the photographing aperture value, four sets of values of a6, b6, c6, d6, e6 and f6, which are extracted from ΔIB1, ΔIB2, ΔIB3 and ΔIB4, respectively, may be transmitted.

(When the Af Region is Located Outside the Optical Axis)

As described with reference to FIG. 1C, an error of the optimum location of an image surface of the imaging lens may occur, according to an image height. Thus, when the AF region is located outside the optical axis, the optimum location error information includes a difference between the frequency band for determining the optimum location of the image surface and the frequency band for performing the AF detection, and a correction value of the optimum location of the focus lens 104, which is caused by an image height. The error of the optimum location of an image surface of the imaging lens is ΔIBoff of FIG. 1C, and will now be described in detail with reference to FIGS. 7A and 7B.

Figure 7A:
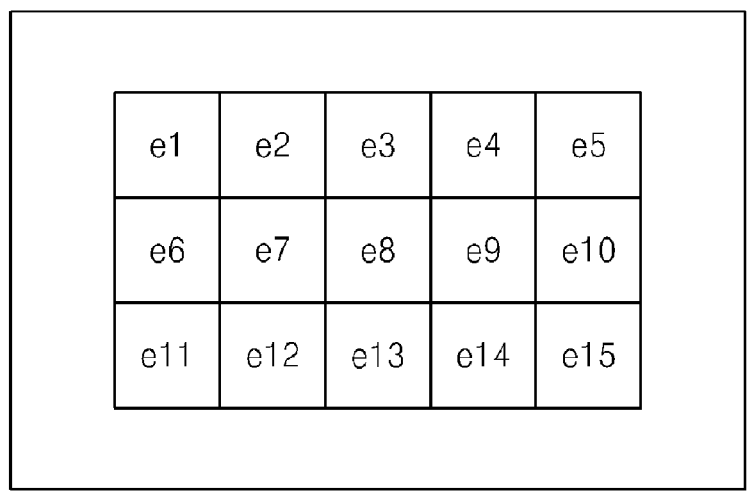
FIG. 7A shows a case where a portion of a captured image is divided into a plurality of regions, according to an embodiment of the invention.

FIG. 7A shows a case where a portion of a captured image is divided into a plurality of regions, according to an embodiment of the invention. AF detection regions includes 15 regions e1 through e15 including a central region e8. In the multi-division AF detection, information of a peak location obtained from each of the AF detection regions, and at least one region suitable for performing AF from the AF estimation value are selected, and a focus lens is driven from the selected region to the peak location. In this case, the AF detection region may by automatically selected by the camera system 1, or may be manually selected by a user.

In the presence of a plurality of AF detection regions, the error ΔIBoff outside the optical axis may vary according to an image height due to the characteristics of a lens, as described above. As illustrated in FIG. 7A, in the presence of 15 AF detection regions, the regions e3, e7, e9, and e13 are spaced apart from the central region e8 by an image height corresponding to about one region, that is, substantially the same distance. In this case, the 'about one region' refers to a distance from a center of the region central region e8 to a center of another region. Since each of the AF detection regions is not square, the distances between the central region e8, and the regions e3, e7, e9, and e13 do not have strictly the same. However, since a screen ratio is about 4:3, it may be assumed that the distances are the same. In addition, the regions e2, e4, e12, and e14 are spaced apart from the central region e8 by an image height corresponding to about 1.4 region, that is, the same distance. The regions e6 and e10 are spaced apart from the central region e8 by an image height corresponding about two regions, that is, the same distance. Lastly, the regions e1, e5, e11, and e15 are spaced apart from the central region e8 by an image space corresponding to about 2.2 region, that is, the same distance.

Figure 7B:
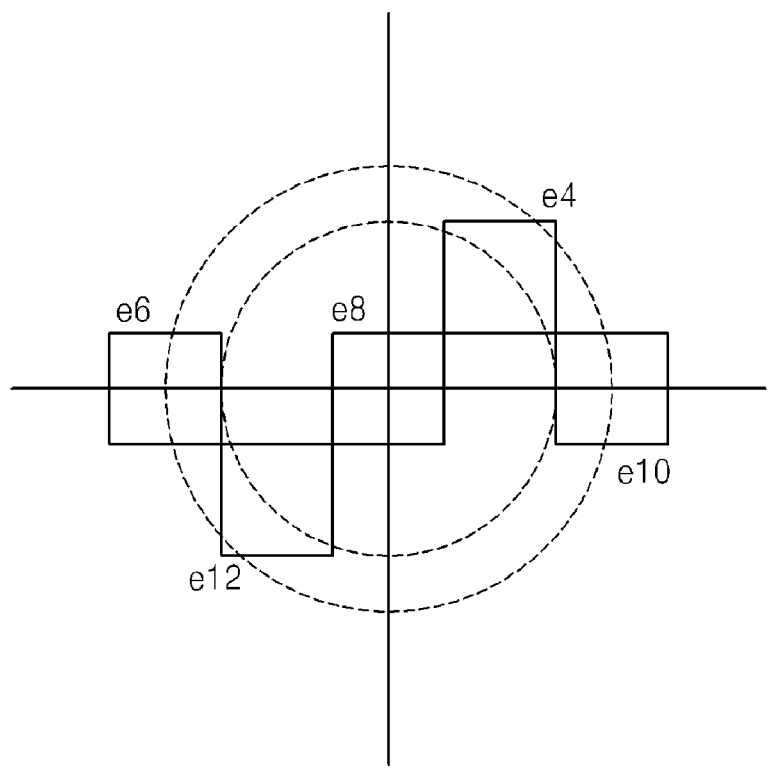
FIG. 7B is a diagram for explaining an image height of the AF detection regions.

FIG. 7B is a diagram for explaining an image height of the AF detection regions. Referring to FIG. 7B, concentric circles and some of the plurality of AF detection regions are illustrated. In this case, the AF detection regions located on the concentric circles not on the central region e8 may have the error ΔIBoff outside the optical axis. In addition, AF detection regions located on a same concentric circle may have same image height.

As shown in FIGS. 7A and 7B, when the AF detection region is divided, there are five image heights according to AF detection regions, and a value ΔIBoff may vary according to an AF detection region. Thus, the lens 100 may have a value ΔIBoff that varies according to an image height, which may be sequentially indicated as ΔIBeA, ΔIBeB, ΔIBeC, ΔIBeD, and ΔIBeE according to an image height.

Since the value ΔIBoff based on an image height may vary according to a focal length, a photographing distance, or an aperture value, the lens 100 may have a value ΔIBoff corresponding to these conditions. Thus, ΔIBeA may include ΔIBeA1 through ΔIBeA4, which is similarly applied to the remaining image heights.

Figure 8:
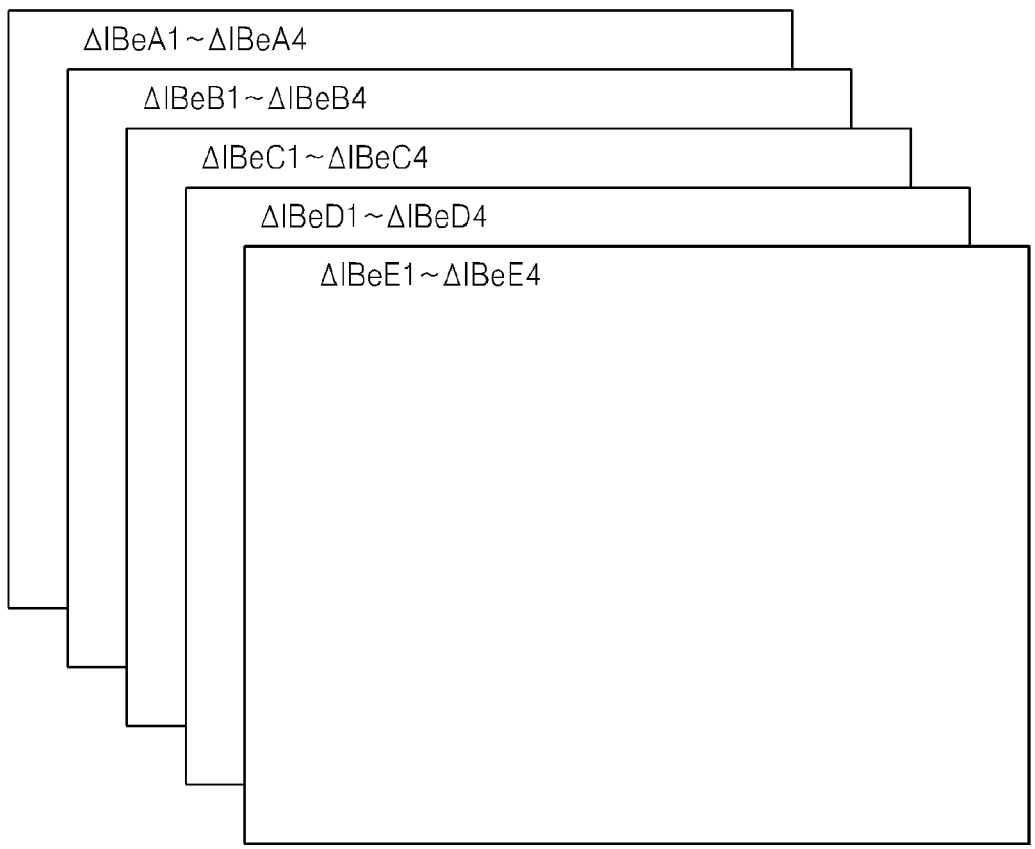
FIG. 8 shows optimum location error information, according to another embodiment of the invention.

FIG. 8 shows optimum location error information, according to another embodiment of the invention. Like in FIG. 6, coefficients of an equation of higher degree may be stored in the form of table. As described above, values of the table vary according to the image height, and thus the same number of tables as the number of image heights are prepared and stored in the lens memory 112. In addition, the values of the table vary according to the photographing aperture value, and thus the same number of tables as the number of photographing aperture values are prepared for each image height, and are stored in lens memory 112. In this case, since the case of FIG. 8 includes a case where the AF detection region is located in a central portion (ΔIBeA), when the lens memory 112 stores the optimum location error information shown in FIG. 8, the optimum location error information shown in FIG. 6 is not required.

The coefficients of each degree of the equation of higher degree have been described already, and thus will be omitted. In addition, as described with reference to FIG. 6, since ΔIBeA1, ΔIBeA2, ΔIBeA3, and ΔIBeA4 due to the photographing aperture value may meet ΔIBeA1≈2ΔIBeA2≈4ΔIBeA3≈8ΔIBeA4, only ΔIBeA1 for the first image height is stored instead of storing all of ΔIBeA1, ΔIBeA2, ΔIBeA3, and ΔIBeA4. Then, the remaining values may be calculated in the camera system 1. This is similarly applied to the remaining image heights.

The optimum location error information may be stored in the form of table including ΔIBeA1 through ΔIBeE4 calculated according to a focal length, a photographing distance, an aperture value, and an image height, but not coefficients of a function. That is, calculation results of an equation of higher degree may be stored in the form of table.

The camera controller 209 selects a coefficient corresponding to the photographing aperture value and the AF detection region, from among the transmitted plurality of pieces of optimum location error information (operation S113).

When the optimum location error information is selected, the error ΔIB or ΔIBoff is calculated using the selected optimum location error information (operation S114). The error ΔIB or ΔIBoff may be obtained by inserting 1/LVpk into 'x' of the equation of higher degree, where 1/LVpk is a reciprocal of the AF detection point of time, that is, an optimum location. The calculation result has a unit of 'μm'. Thus, a correction amount is calculated with respect to the driving amount of the focus lens 104 by multiplying a conversion coefficient KL by the calculation result (that is, ΔIB (or ΔIBoff)×KL) (operation S115). A unit of the driving amount may be the number of pulses for driving the lens driving actuator 105. The conversion coefficient KL is a value when the focus lens 104 is closest to the optimum location LVpk.

When the correction amount is calculated with respect to the driving amount of the focus lens 104, a target driving amount of the focus lens 104 is corrected in consideration of the calculation result (operation S116).

The focus lens 104 is driven according to the corrected target driving amount to be in focus (operation S117).

When it is determined that the difference between the AFF and the FIB is smaller than the reference Q, in operation S111, operation S117 proceeds directly without correcting the error EIB. That is, the focus lens 104 is driven to move to a target location without correcting the optimum location obtained using the AF estimation value calculated in operation S109.

When the focus lens 104 is driven to move to the target location in operation S117, success in the AF operation is displayed (operation S118).

When it is determined that the actual peak value Vpk of the AF estimation value is smaller than the reference value PKT, it is determined that contrast of an image signal is not clear, and driving of the focus lens 104 is stopped (operation S119). 'NG' indicating failure in the AF operation is displayed (operation S120).

The AF operation 'A' is finished after performing the above-described operations.

Second Embodiment

Second Embodiment of Camera System

Figure 9:
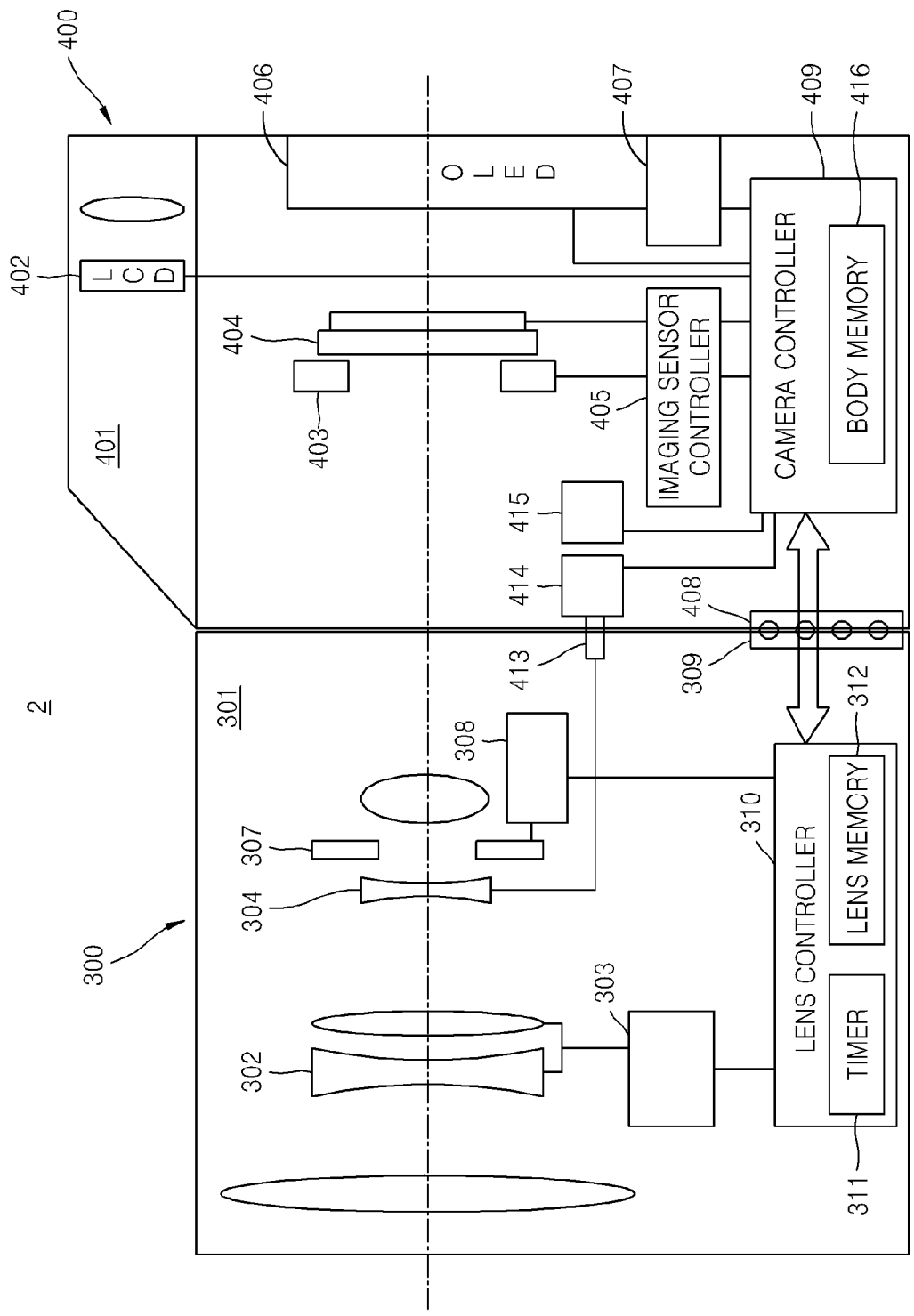
FIG. 9 is a diagram of a camera system according to another embodiment of the invention.

FIG. 9 is a diagram of a camera system 2 according to another embodiment of the invention. The camera system 2 has similar configuration and function to those of the camera system 1 of FIG. 2, and thus the camera system 2 will be described in terms of differences from FIG. 2.

In the camera system 2, optimum location error information is stored in a body unit 400 in order to correct an optimum location.

The camera system 2 includes a lens driving actuator 414 for driving a focus lens 304, a focus lens location detecting sensor 415, and a coupler 412 for transmitting driving power to a lens 300, which are installed in a side of the body unit 400. However, the embodiment is not limited thereto. That is, the focus lens 304 may be driven in the lens 300, as shown in FIG. 2.

According to the embodiment, a correction value corresponding to the optimum location error information, or a coefficient ΔIB or ΔIBoff of the optimum location error information is stored in a side of the body unit 400 of the camera system 2, and thus a camera controller 409 includes a body memory 416 for storing the error ΔIB or the coefficients. According to a kind of replaceable lens, an AF operation may be performed using a phase difference AF method only. In this case, the optimum location error information ΔIB or ΔIBoff does not exist. Thus, in order to perform the AF operation by using a contrast AF method on the lens 300, the optimum location error information is stored in the body memory 416. According to the lens 300 is not limited to any particular lens, and thus optimum location error information of various lenses is stored in the body memory 416.

In FIG. 9, the body unit 400 may determine information of a location of the focus lens 304 without receiving the information of the location of the focus lens 304. However, peculiar information of the lens 300 may be stored in a lens memory 312, and may be transmitted to the body unit 400 in order to select the optimum location error information. Conversion coefficients of the current driving amount and focus deviation amount of the focus lens 304 may require a coefficient KL of the lens 300 and a coefficient KB of the body unit 400, respectively, and an entire conversion coefficient KA may be obtained by KL×KB.

[Configuration of Camera Controller]

Figure 10:
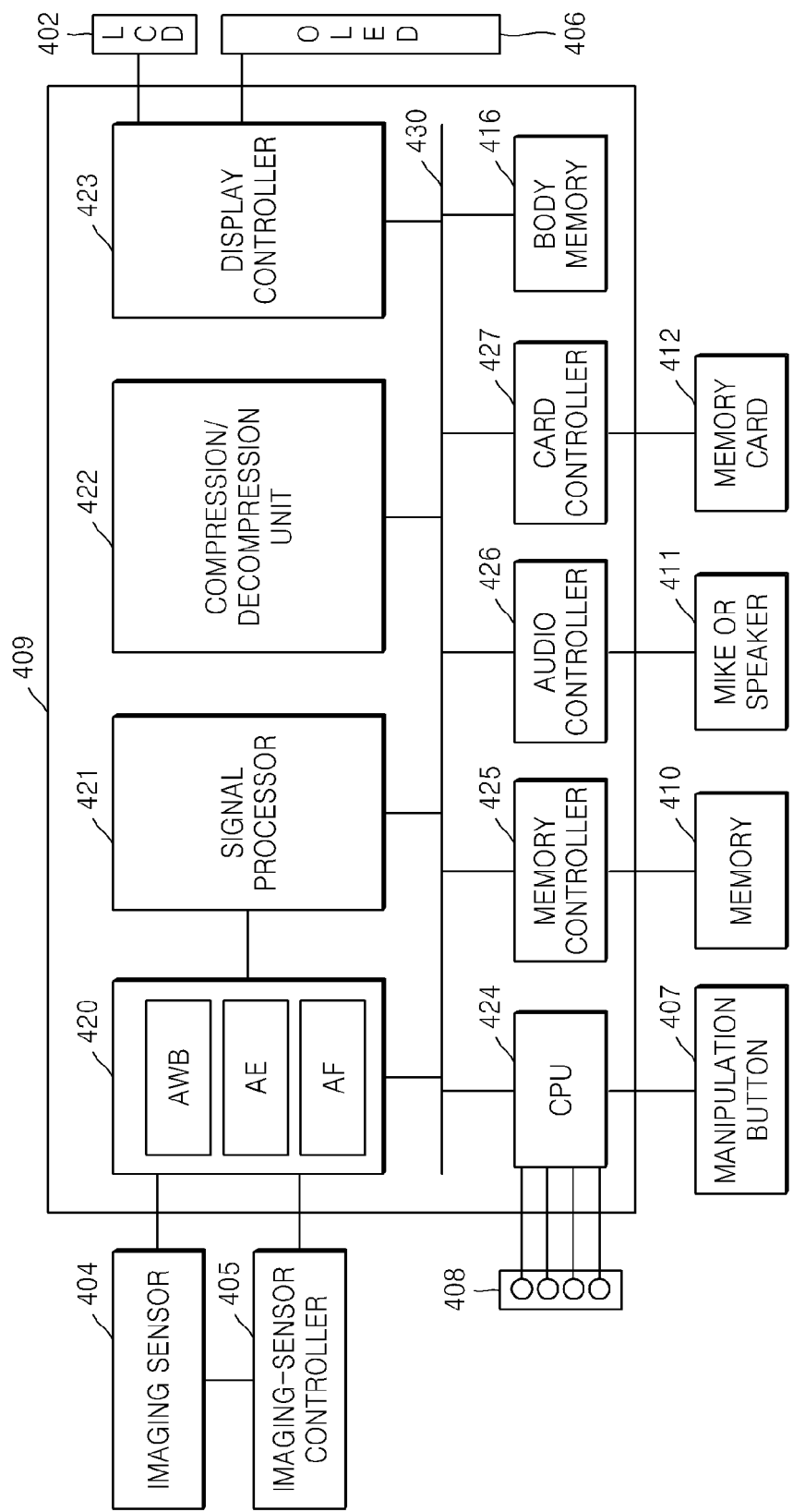
FIG. 10 shows a camera controller, according to another embodiment of the invention.

FIG. 10 shows the camera controller 409, according to another embodiment of the invention.

The camera controller 409 is the same as the camera controller 209 of FIG. 3, except for the camera controller 409 includes the body memory 416 for storing the optimum location error information. The configuration of the camera controller 409 is the same as that of the camera controller 209 of FIG. 3, and thus its details are not repeated.

[Controlling Method of Camera System]

Figure 11A:
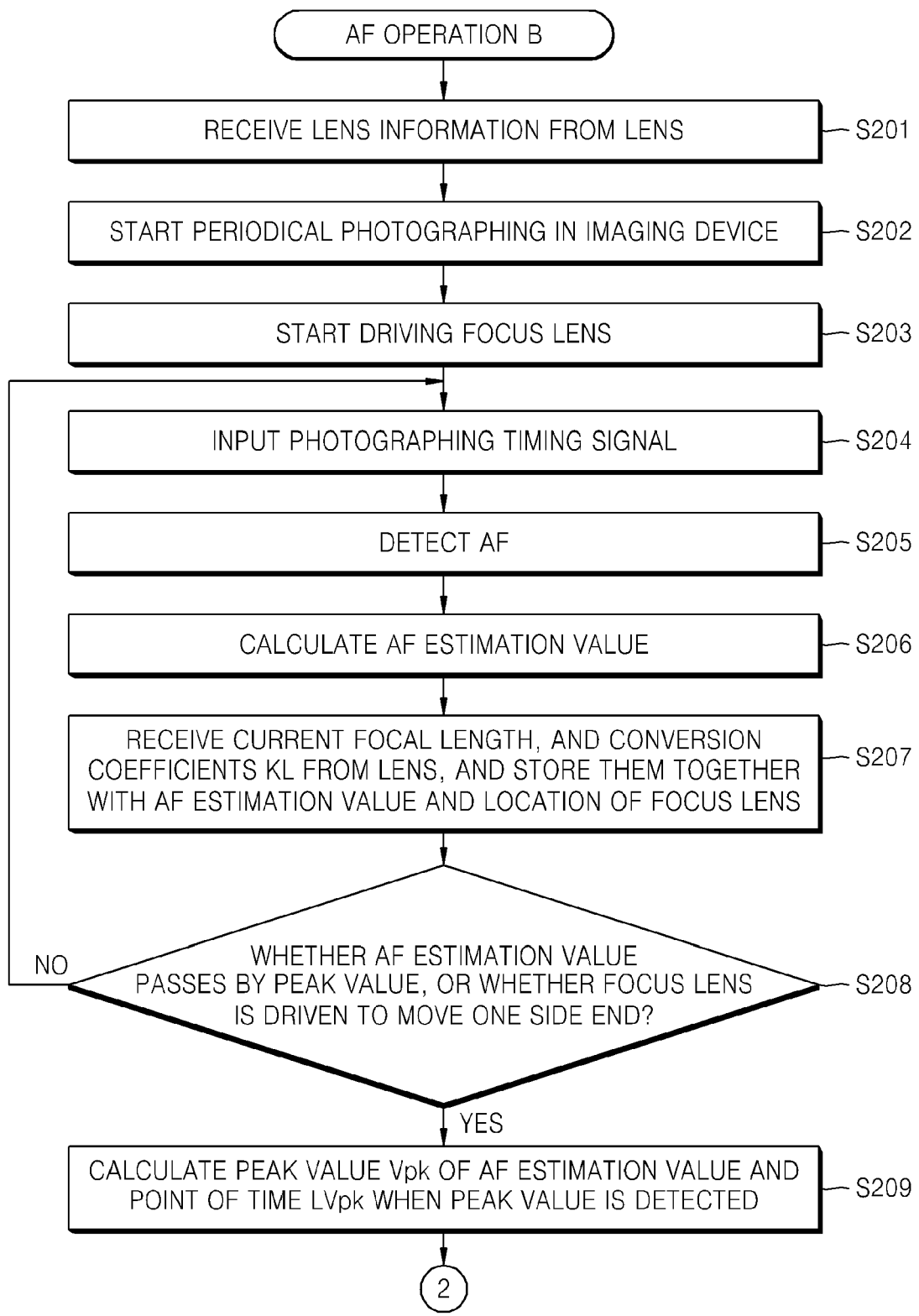
FIGS. 11A and 11B are flowcharts of a controlling method of the camera system of FIG. 9, according to another embodiment of the invention.
Figure 11B:
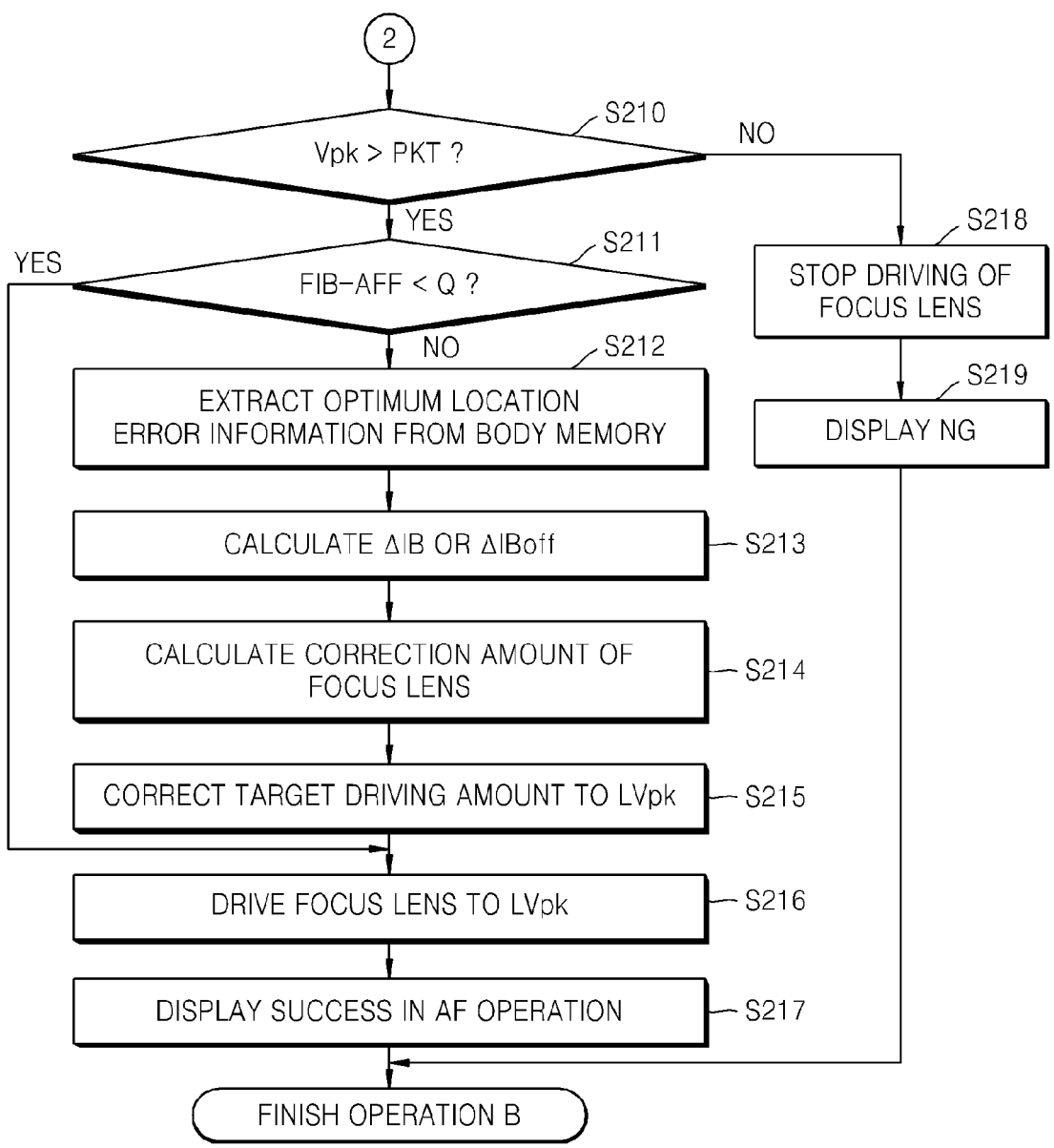

FIGS. 11A and 11B are flowcharts of a controlling method of the camera system 2 of FIG. 9, according to another embodiment of the invention.

When power is supplied to the camera system 2, and the shutter release button is pressed halfway, an AF operation 'B' is started. When the AF operation 'B' is started, the camera controller 409 receives lens information from the lens 300 (operation S201). The lens information includes various peculiar parameters of lenses, and is stored in the lens memory 312, and includes information regarding a type of lens. The imaging sensor 404 periodically captures an image to generate an image signal (operation S202). The camera controller 409 drives the focus lens 304 directly (operation S203). According to a control signal, the focus lens 304 is driven to move from one side to the other side.

When the focus lens 304 starts to be driven, a photographing timing signal is input to a CPU 424 (operation S204).

When the photographing timing signal is input, the AF detection is performed by inputting an image signal of the AF detection region to an AF detection circuit of preprocessor 420 of the camera controller 409 from the imaging sensor 404 (operation S205). The AF estimation values are calculated by performing the AF detection AF (operation S206).

Information regarding the current focal length, and conversion coefficients KL of the current driving amount of the focus lens 304 and focus deviation amount are obtained from the lens 300. The information regarding the current focal length, and the conversion coefficients KL are stored together with the AF estimation values, and information regarding a location of the focus lens 304 at AF detection timing, wherein these pieces of information constitute a set (operation S207).

It is determined whether the AF estimation value passes by the peak value, or whether the focus lens 304 is driven to move to one side end (operation S208). When the focus lens 304 is not driven to move to one side end, and the peak value is not detected, the method returns back to operation S204 to continue to calculate AF estimation values.

When the peak value exists in the AF estimation values, or the focus lens 304 is driven to move to one side end, an actual peak Vpk and a point of time LVpk when the peak value is detected (operation S209). In addition, it is determined whether the actual peak value Vpk of the AF estimation value is greater than a reference value PKT (operation S210).

When it is determined that the actual peak value Vpk of the AF estimation value is smaller than the reference value PKT, driving of the focus lens 304 is stopped, like in FIG. 5B (operation S218). 'NG' indicating failure in the AF operation is displayed (operation S219).

When it is determined that the actual peak value Vpk of the AF estimation value is greater than the reference value PKT, it is determined that it is possible to adjust AF. The central frequency AFF of the frequency band for performing the AF detection is compared with the frequency band FIB for determining the optimum location of the image surface of the imaging lens, and then it is determined whether the difference between the AFF and the FIB is smaller than a reference Q (operation S211).

When the difference between the AFF and the FIB is greater than the reference Q, errors ΔIB or ΔIBoff occurs. Thus, the optimum location error information is extracted from the body memory 416 in order to correct the errors ΔIB (operation S212). The extracted optimum location error information may be determined according to a type of lens.

Figure 12:
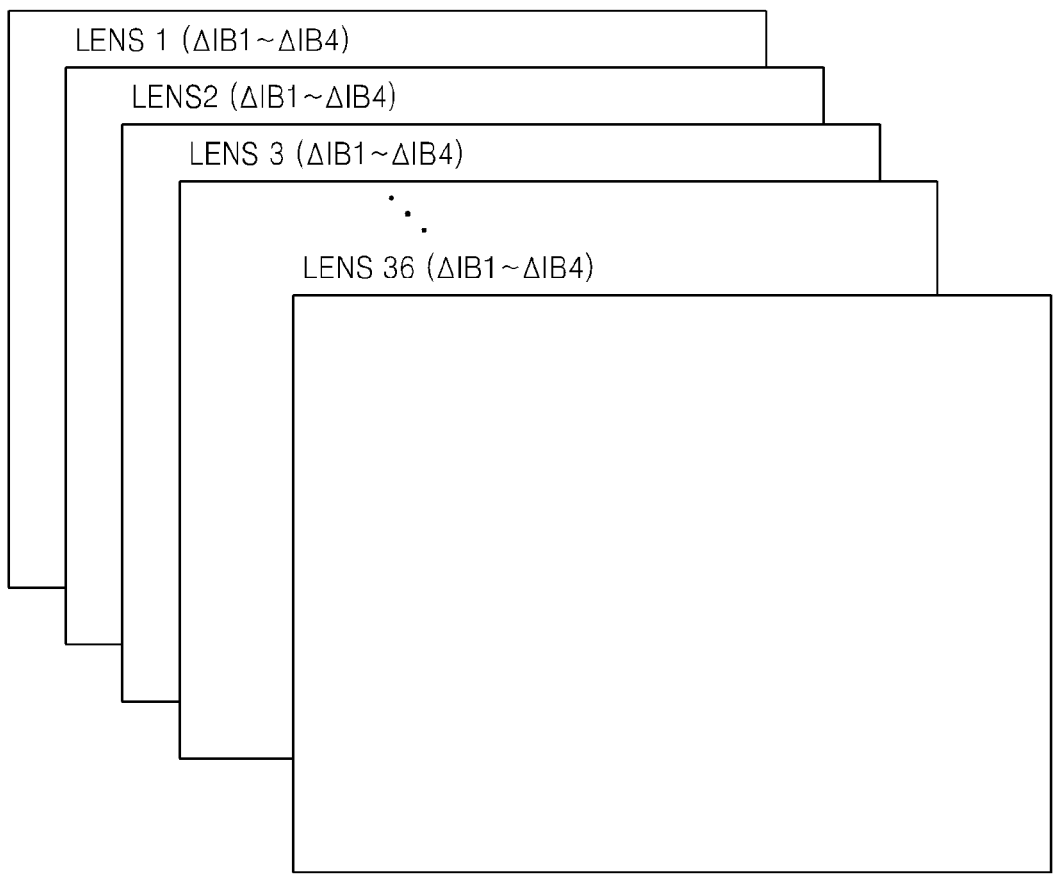
FIG. 12 shows optimum location error information, according to another embodiment of the invention.

FIG. 12 shows optimum location error information, according to another embodiment of the invention. Various pieces of optimum location error information are shown for 36 types of replaceable lenses (lens 1 through lens 36). In addition, each piece of optimum location error information has a set of a plurality of pieces of optimum location error information varying according to a focal length, a photographing distance, and a photographing aperture value.

FIG. 13 shows optimum location error information, according to another embodiment of the invention. The optimum location error information exists for each of the 36 kinds of replaceable lenses LENSES 1 through 36. In addition, the optimum location error information for each lens includes a set of optimum location error information according to an image height shown in FIG. 8. In this case, the eight (8) image heights will be described with reference to FIG. 10.

Figure 14:
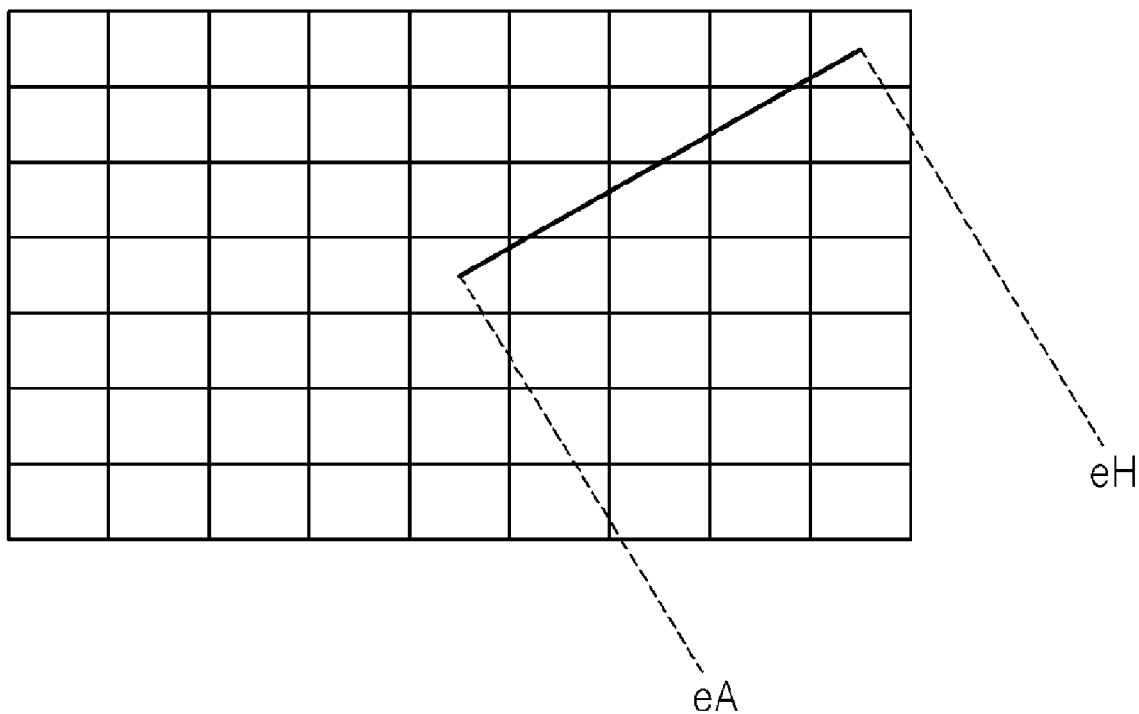
FIG. 14 shows a case where a portion of a captured image is divided into a plurality of regions, according to another embodiment of the invention.

FIG. 14 shows a case where a portion of a captured image is divided into a plurality of regions, according to another embodiment of the invention. Referring to FIG. 14, an entire region of the imaging sensor 404 is divided into 9×7 AF detection regions. In this case, AF detection may be performed on the entire region. In addition, a predetermined AF detection region may be selected by a pitch corresponding to half the divided region. Thus, the number of AF detection regions to be set is substantially 17×13. In this case, according to the current embodiment, optimum location error information is not prepared for all image heights that may be the AF detection regions, unlike in FIGS. 7A through 8. According to the current embodiment, a line connecting a center of the central AF detection region and a center of the last AF detection region is divided into 8 portions, and optimum location error information is prepared according to the 8 divided image heights. That is, optimum location error information corresponding to an image height that is closest to a center of the AF detection region that is set from among the 8 divided image heights is selected. Thus, a capacity of a memory for correcting an optimum location may be reduced. However, the current embodiment is not particularly limited. For example, as shown in FIG. 7A, a portion of the imaging sensor 404 may be divided into 15 portions.

The optimum location error information extracted in operation S212 may be determined according to a focal length, a photographing distance, and a photographing aperture value.

The camera controller 409 calculates the error ΔIB or ΔIBoff by using the extracted optimum location error information (operation S213). The error ΔIB ΔIBoff may be obtained by inserting 1/LVpk into 'x' of the equation of higher degree, where 1/LVpk is a reciprocal of the AF detection point of time, that is, an optimum location. In FIGS. 12 and 13, a separate set of optimum location error information is prepared for all the respective aperture values. However, as described above, optimum location error information is prepared only when an aperture is opened, and the remaining aperture values may be calculated in the camera system 1.

The calculation result has a unit of 'μm'. Thus, a correction amount is calculated with respect to the driving amount of the focus lens 304 by multiplying a conversion coefficient KA by the calculation result (operation S214). A unit of the driving amount may be the number of pulses for driving the lens driving actuator 414.

When the correction amount is calculated with respect to the driving amount of the focus lens 304, a target driving amount of the focus lens 304 is corrected in consideration of the calculation result (operation S215).

The focus lens 304 is driven according to the corrected target driving amount to be in focus (operation S216), and success in the AF operation is displayed (operation S217).

When it is determined that the difference between the AFF and the FIB is smaller than the reference Q, in operation S211, operation S216 proceeds directly without correcting the error EIB. That is, the focus lens 304 is driven to move to a target location without correcting the optimum location obtained using the AF estimation value calculated in operation S209.

The AF operation 'B' is finished after performing the above-described operations.

Third Embodiment

Next, a camera system according to another embodiment will be described. The camera system according to the current embodiment has the same configuration as the camera system 1 of FIG. 2, except that the conversion coefficient KL is reflected to optimum location error information, and a device for transmitting information regarding frequency characteristics for designing the lens 100 to the body unit 200 of the camera system 1 is used.

[Controlling Method of Camera System]
<Controlling Method of Body Unit>

Figure 15A:
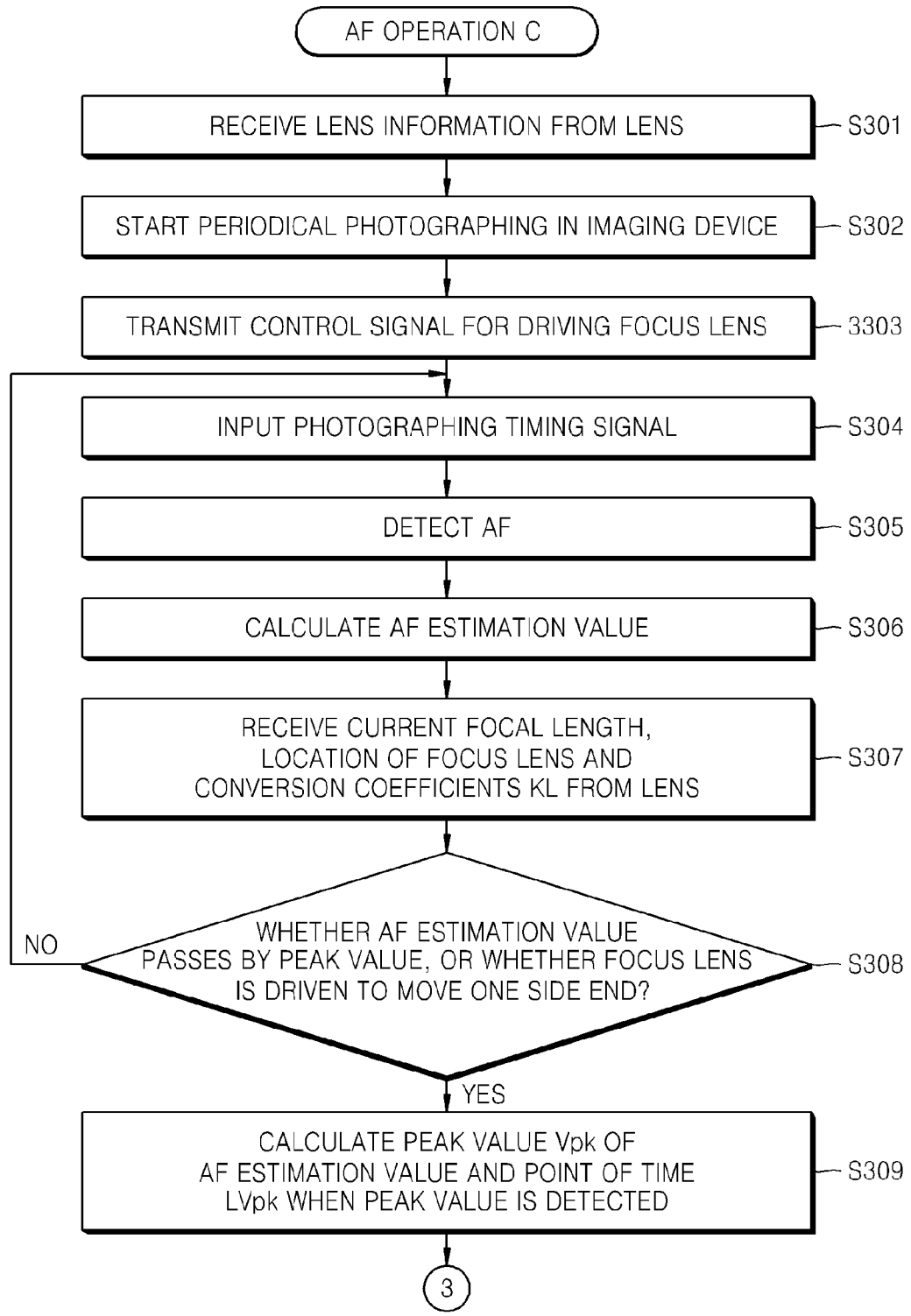
FIGS. 15A and 15B are flowcharts of a controlling method of the camera system 1 of FIG. 2, according to another embodiment of the invention.
Figure 15B:
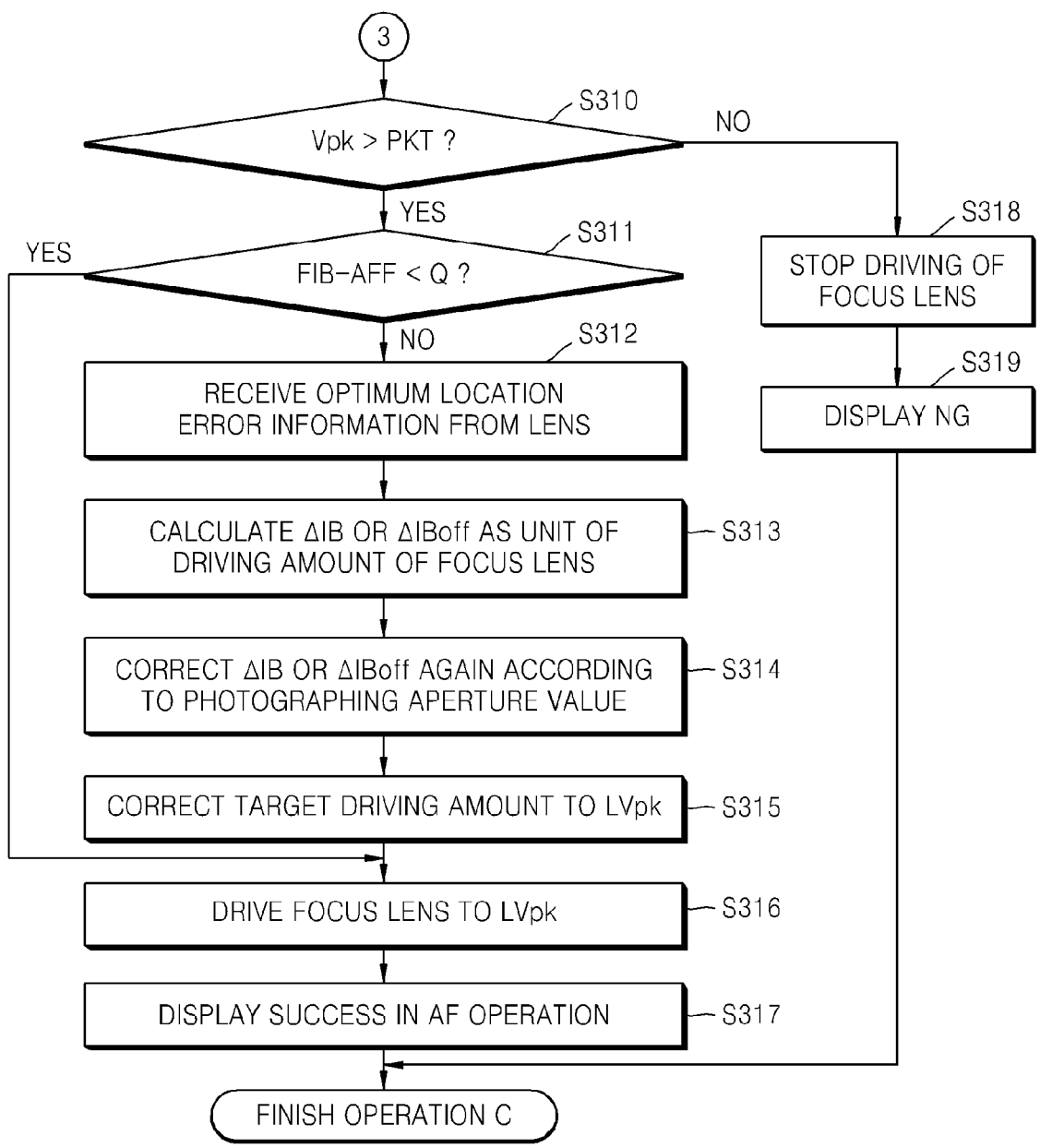

FIGS. 15A and 15B are flowcharts of a controlling method of the camera system 1 of FIG. 2, according to another embodiment of the invention.

Operations S301 through S311 and S315 through S319 are similar to operations S101 through S111 and S116 through S120 of FIGS. 5A and 5B, respectively.

A difference is that lens information of operation S301 includes information of the frequency band FIB for the optimum location of the image surface of the lens 100, which is determined during design. The FIB may vary according to a kind of lens.

Another difference is a central frequency of the frequency band is AFF when AF detection is performed in operation S305. The AFF may be fixed by the body unit 200, may vary according to an operation mode of the camera system 1 or conditions of a subject, or may include a plurality of frequencies. According to the current embodiment, the AFF is determined according to predetermined conditions.

When it is determined that the difference between the AFF and the FIB is greater than the reference Q, in operation S311, the optimum location error information is obtained from the lens 100 (operation S312). The optimum location error information is a coefficient related to the error ΔIB or ΔIBoff, and a correction amount is calculated to be represented by a driving amount of the focus lens 104. That is, the optimum location error information is a function of a conversion coefficient KL.

Since the conversion coefficient KL does not show a linear change, a function indicating the optimum location error information according to the current embodiment has a higher degree by one than in the first embodiment. That is, the error ΔIB (or ΔIBoff) may be represented by an equation of six degrees, for example, $\Delta IB$ (or $\Delta IBoff) = Gx^6 + Hx^5 + Ix^4 + Jx^3 + Kx^2 + Lx + M$, where x is a reciprocal of a distance. G, H, I, J, K, L and M vary according to the focal length. FIG. 16 is a table showing optimum location error information, according to another embodiment of the invention. Compared with FIG. 6, FIG. 12 illustrates a case where the number of coefficients is greater than in FIG. 6 by one. FIG. 16 shows optimum location error information when the AF detection region is located in a central portion of the imaging sensor 404.

In detail, in FIG. 16, a vertical direction indicates a focal length corresponding to the number of divisions of an encoder for detecting a location of a zoom lens, and a horizontal direction indicates coefficients G, H, I, J, K, L and M. The table is stored in the lens memory 112. Since the values of the table vary according to not only design values of the lens 100 but also manufacturing errors of the lens 100, the error ΔIB of each lens is measured, and correction coefficients thereof are stored in the lens memory 112.

In addition since ΔIB1, ΔIB2, ΔIB3 and ΔIB4 due to the photographing aperture value meets ΔIB1≈2ΔIB2≈4ΔIB3≈8ΔIB4, only ΔIB1 for a case where the aperture is open is stored instead of storing all of ΔIB1, ΔIB2, ΔIB3 and ΔIB4. Then, the remaining values may be calculated using ΔIB1.

Figure 17:
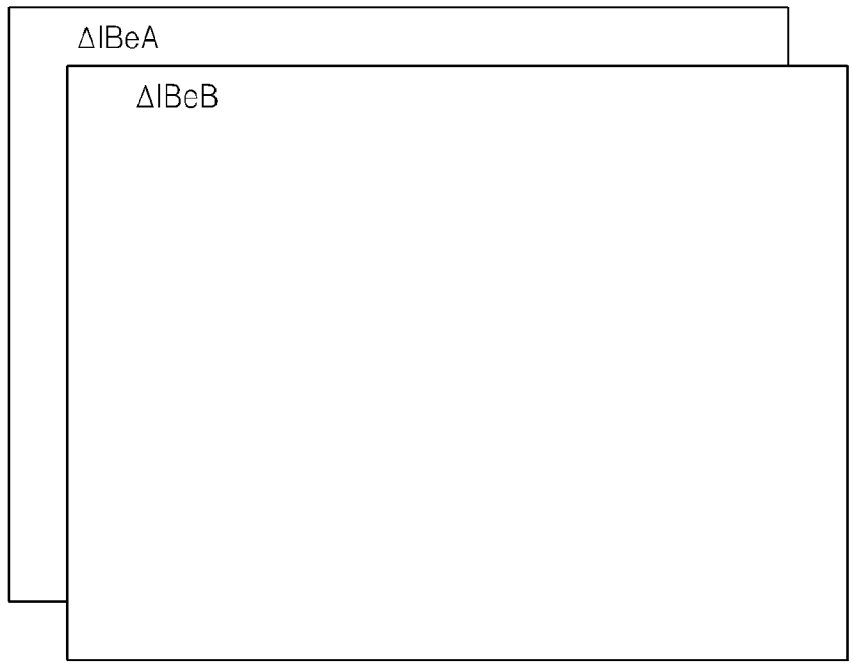
FIG. 17 shows optimum location error information, according to an embodiment of the invention.

FIG. 17 shows optimum location error information, according to an embodiment of the invention. FIG. 17 shows optimum location error information when an AF detection region is located outside an optical axis, as well as when an AF detection region is located in a central portion of an imaging sensor, that is, on the optical axis.

In FIG. 17, optimum location error information ΔIB of the case where the AF detection region is located on the optical axis is stored as ΔIBeA. In addition, in order to calculate optimum location error information of the case where the AF detection region is located outside the optical axis, ΔIBoff at a predetermined image height is stored as ΔIBeB. When the AF detection region is located outside the optical axis, correct optimum location error information according to an image height may be obtained by interpolation with ΔIBeA and ΔIBeB. An equation used to the interpolation may be a primary approximate equation, a secondary approximate equation, or more equations. (In this case, coefficients used to the interpolation may be determined according to aberrations of a lens, or a representative location of ΔIBeB (the predetermined image height).)

When the optimum location error information is input, the error ΔIB or ΔIBoff is calculated using the input optimum location error information (operation S313). The error ΔIB or ΔIBoff may be obtained by inserting 1/LVpk into 'x' of the equation of higher degree, where 1/LVpk is a reciprocal of the AF detection point of time, that is, an optimum location. Thus, the calculated result is represented by a correction amount with respect to the driving amount of the focus lens 104.

When the correction amount is calculated with respect to the driving amount of the focus lens 104, the error ΔIB or ΔIBoff is corrected again according to the photographing aperture value (operation S314). For example, when the aperture is narrowed in a first step, the error ΔIB or ΔIBoff is corrected to ½ of the error ΔIB calculated in operation S313. When the aperture is narrowed in a second step, the error ΔIB or ΔIBoff is corrected to ¼ of the error ΔIB calculated in operation S313.

A target driving amount of the focus lens 104 is corrected using the error ΔIB or ΔIBoff that is corrected again (operation S315), and the focus lens 104 is driven according to the corrected target driving amount (operation S316). Success in the AF operation is displayed in operation S317, and then an AF operation 'C' is finished.

<Controlling Method of Lens>

Figure 18:
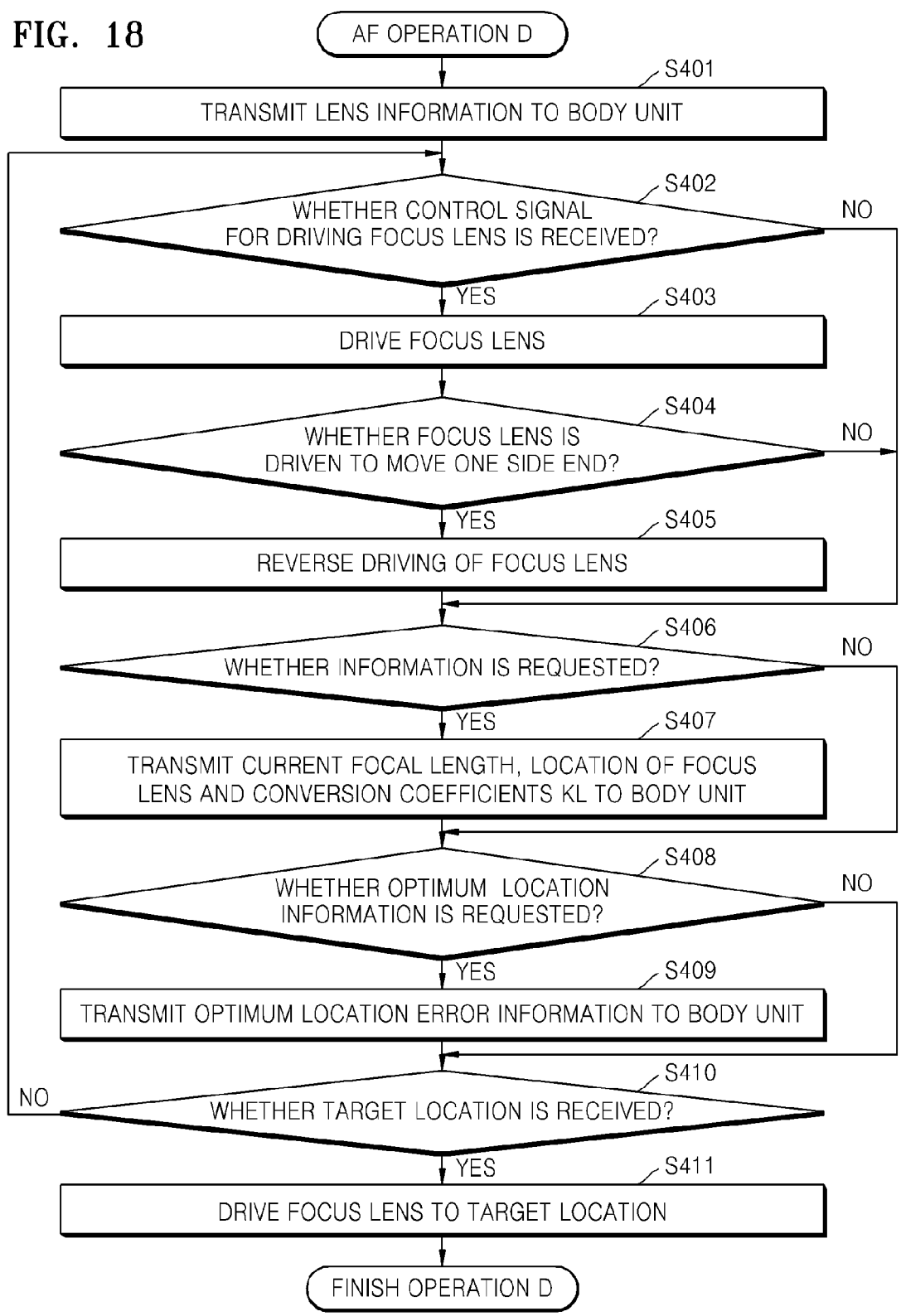
FIG. 18 is a flowchart of a controlling method of a lens of the controlling method of the camera system of FIG. 11, according to an embodiment of the invention.

FIG. 18 is a flowchart of a controlling method of a lens of FIGS. 15A and 15B, according to an embodiment of the invention.

When power is supplied to the camera system 1, and the shutter release button is pressed halfway, an AF operation D' is started. When the AF operation D' is started, lens information is transmitted to the body unit 200 (operation S401). The lens information is information required for the body unit 200 to use the lens 100, and includes various peculiar parameters of lenses. The lens information includes information regarding a frequency band 'FIB' for determining an optimum location of an image surface of the imaging lens.

It is determined whether a control signal for driving the focus lens 104 is received (operation S402). When the control signal is received, the focus lens 104 is driven according to the control signal (operation S403). It is determined whether the focus lens 104 is driven to move to one side end (operation S404). When the focus lens 104 is driven to move to one side end, the focus lens 104 is driven to move to an opposite direction (operation S405). When the focus lens 104 is not driven to move to one side end, operation S405 is not performed.

When the control signal is not received in operation S402, operation S406 is performed.

It is determined whether the body unit 200 requests for information (operation S406). When the body unit 200 requests for information, the current focal length, a location of a focus lens, and a conversion coefficient KL are transmitted to the body unit 200 (operation S407).

It is determined whether the body unit 200 requests for optimum location error information (operation S408). When the body unit 200 requests for the optimum location error information, the optimum location error information is transmitted to the body unit 200 (operation S409).

Then, it is determined whether a target location for driving the focus lens 104 is received from the body unit 200 (operation S410). When the target location is received, the focus lens 104 is driven to move to the target location (operation S411). The received target location may be corrected using an optimum location calculated by the camera controller 209 as the optimum location error information. Alternatively, the target location may not be corrected.

The AF operation D' is finished after performing the above-described operations.

Although not illustrated, if it is impossible to detect AF, or the AF detection is not performed since the shutter release button is released, a lens stop signal is transmitted from the body unit 200, and then driving of the focus lens 104 may be stopped.

Fourth Embodiment

A fourth embodiment of the invention will be described. According to the embodiment, a lens and a body portion are integrated with each other.

Third Embodiment of Configuration of Camera System 3

Figure 19:
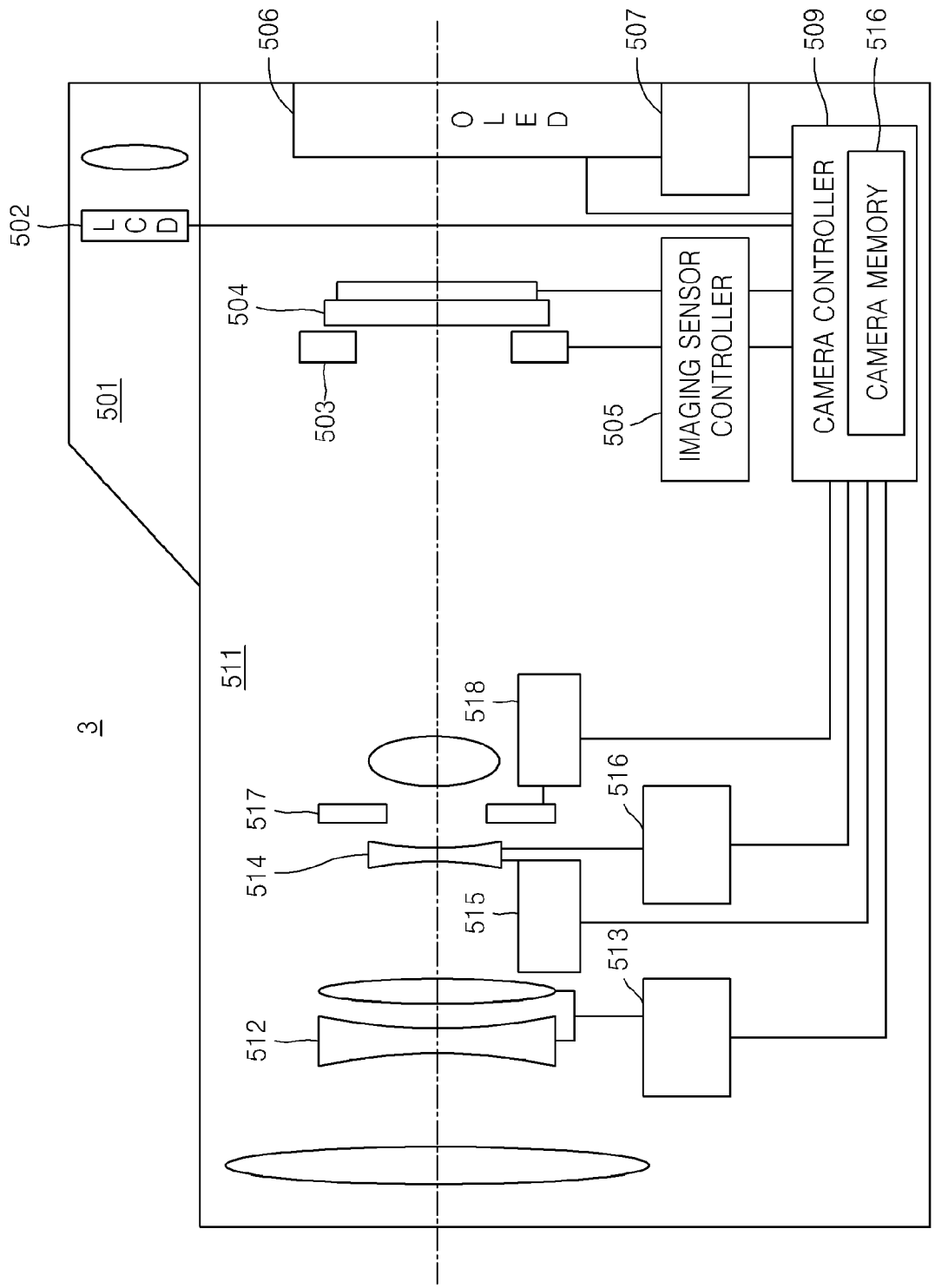
FIG. 19 is a diagram of a camera system according to another embodiment of the invention.

FIG. 19 is a diagram of a camera system 3 according to another embodiment of the invention. The camera system 3 has similar configuration and function to those of the camera system 1 or 2 of FIG. 2 or 9, and thus the camera system 3 will be described in terms of differences from FIGS. 2 and 9.

The camera system 3 may include a view finder 501, a shutter 503 for determining a period of time that light is applied, an imaging sensor 504, an imaging sensor controller 505, a displaying unit 506, a manipulation unit 507, a camera controller 509, and a camera memory 516 for storing peculiar lens information, or ΔIB or ΔIBoff in the camera controller 509.

The camera system 3 may include an imaging optical system 511 including a zoom lens 512, a focus lens 514, and an aperture 517. In addition, the camera system 3 may include a zoom lens location detecting sensor 513, a lens driving actuator 515, a focus lens location detection sensor 516, and an aperture driving actuator 518. According to the invention, a function of the lens controller 101 of FIG. 2 may be performed by the camera controller 509.

[Controlling method of Camera System 3]

Figure 20A:
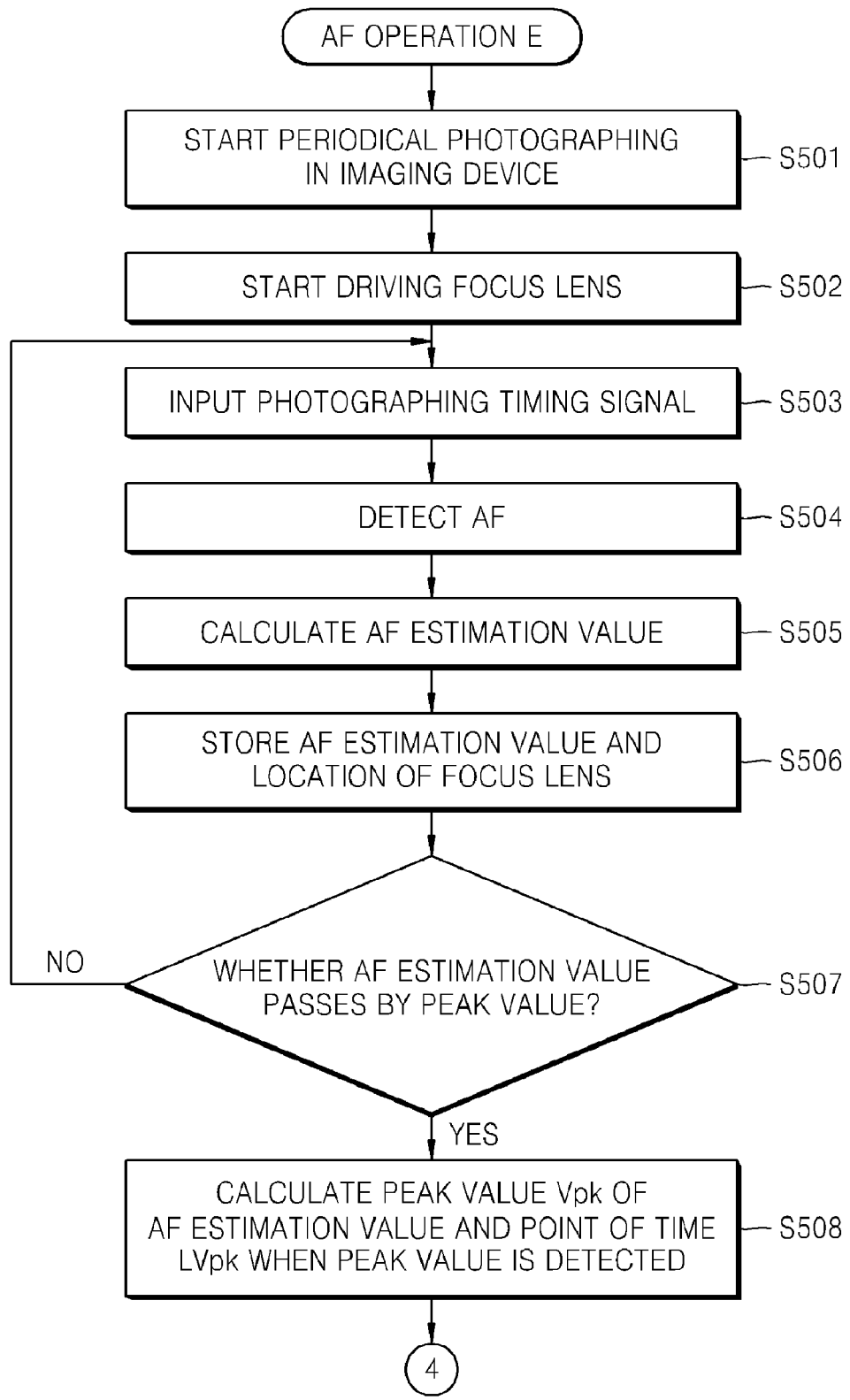
FIGS. 20A and 20B are flows of a method of controlling the camera system of FIG. 19, according to another embodiment of the invention.
Figure 20B:
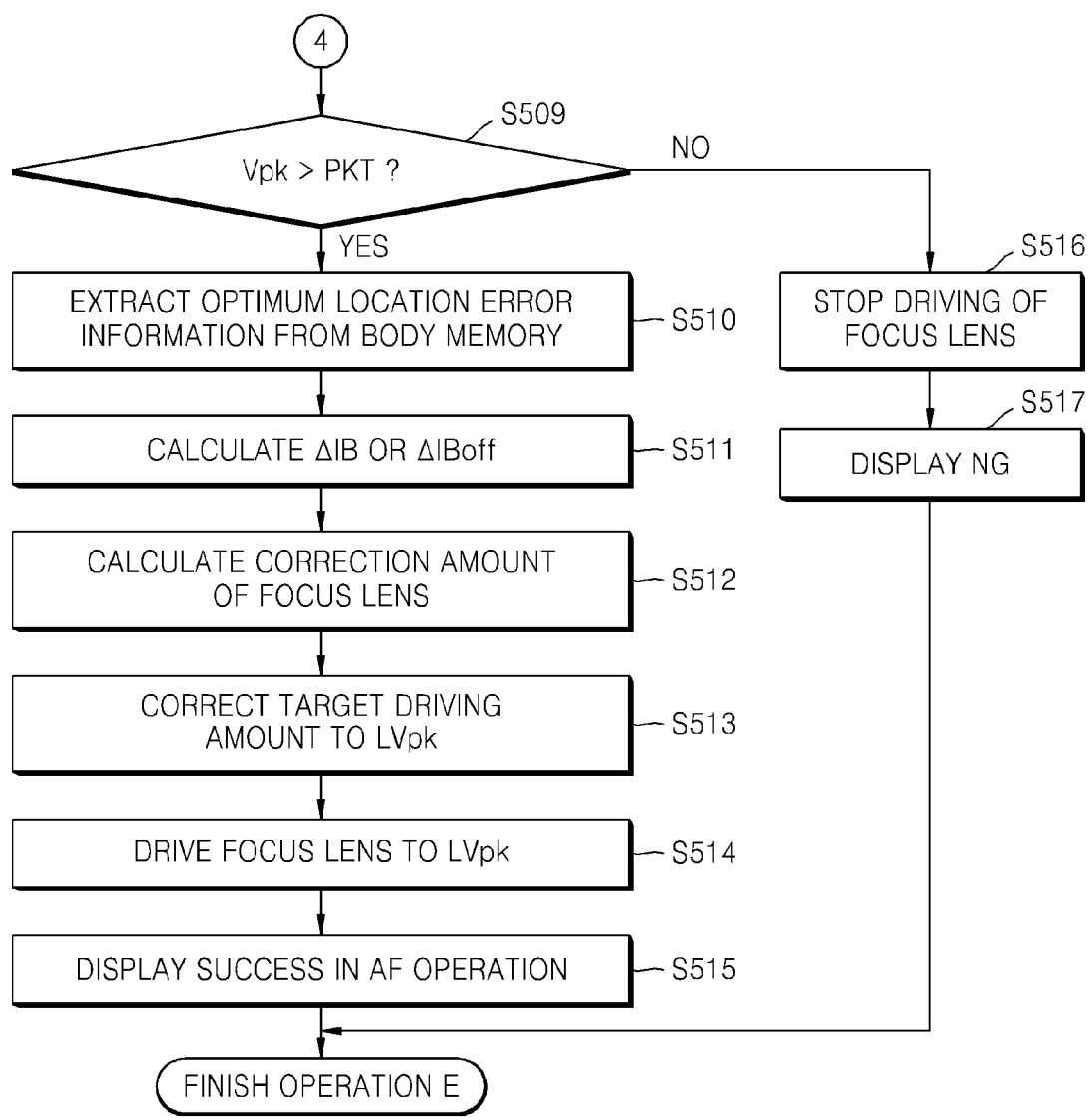

FIGS. 20A and 20B are flowcharts of a method of controlling the camera system 3 of FIG. 19, according to another embodiment of the invention. The method of controlling the camera system 3 is similar to the method of FIGS. 11A and 11B, and thus will be described in terms of differences from FIGS. 11A and 11B.

When power is supplied to the camera system 3, and the shutter release button is pressed halfway, an AF operation 'E' is started. According to the embodiment, since lens information is stored in the camera memory 516, an operation in which lens information is received from the lens 300 is not required after the AF operation 'E' is started, unlike in FIGS. 11A and 11B.

The imaging sensor 504 periodically captures an image, and generates an image signal (operation S501), and the camera controller 509 drives the focus lens 514 directly (operation S502). The focus lens 514 is driven to move from one side to the other side according to a control signal of the camera controller 509.

When the focus lens 514 starts to be driven, a photographing timing signal is input to the imaging sensor controller 505 (operation S503). When the photographing timing signal is input, the AF detection is performed (operation S504), and an AF estimation value is calculated by performing the AF detection (operation S505).

Information regarding the current focal length, and conversion coefficients KL of the current driving amount of the focus lens 514 and focus deviation amount are obtained from the lens 300. The information regarding the current focal length, and the conversion coefficients KL are stored together with the AF estimation values, and information regarding a location of the focus lens 514 at AF detection timing, wherein these pieces of information constitute a set (operation S506).

It is determined whether the AF estimation value passes by the peak value (operation S507). When the peak value is not detected, the method returns back to operation S503 to continue to calculate AF estimation values.

When the peak value exists in the AF estimation values, an actual peak Vpk and a point of time LVpk when the peak value is detected (operation S508). In addition, it is determined whether the actual peak value Vpk of the AF estimation value is greater than a reference value PKT (operation S509).

When it is determined that the actual peak value Vpk of the AF estimation value is smaller than the reference value PKT, driving of the focus lens 514 is stopped (operation S516). 'NG' indicating failure in the AF operation is displayed (operation S517).

When it is determined that the actual peak value Vpk of the AF estimation value is greater than the reference value PKT, it is determined that it is possible to adjust AF. When the camera system 3 does not use a replaceable lens like in FIGS. 20A and 20B, a comparing operation of a frequency is not required. This is because that the camera system 3 knows both a frequency used to the AF detection, and a frequency about an optimum location of an image surface. According to the embodiment, it is assumed that the camera system 3 needs to correct ΔIB or ΔIBoff, the method proceeds to operation S510.

In operation S509, when it is determined that the actual peak value Vpk of the AF estimation value is greater than the reference value PKT, optimum location error information is extracted from the camera memory 516 in order to correct the error ΔIB or ΔIBoff (operation S510). In addition, ΔIB or ΔIBoff according to an AF detection region is calculated using the extracted optimum location error information (operation S511).

A resulting value of the above-calculation has a unit 'μM'. A correction value about a driving amount of the focus lens 514 is calculated by multiplying the resulting value by the conversion coefficient KL (operation S512). When the correction value of the driving amount of the focus lens 514 is calculated, the resulting value is reflected to the correction value so as to correct a target driving amount of the focus lens 514 (operation S513).

The focus lens 514A is driven according to the corrected target driving amount (operation S216), and a success in the AF operation is indicated (operation S515).

As described above, AF may be correctly performed by correcting an optimum location error of a focus lens due to a difference between a frequency band for performing the AF detection and a frequency band for determining the optimum location of the image surface of the imaging lens.

In addition, when the difference between a frequency band for performing the AF detection and a frequency band for determining the optimum location of the image surface of the imaging lens is smaller than a reference, it is determined that the optimum location error is negligible, and thus correction may not be performed.

Moreover, correct AF may be performed by correcting an optimum location error according to an image height when an AF detection region is located outside an optical axis, as well as when the AF detection region is located on the optical axis.

In the claims and throughout this application the word optimum has been used. The definition of optimum used in the application and in the claims should be deemed to include values that are improvements and values that are approximately optimum. That is values that are intended to be peak values, but which may be near the peak or near optimum so that minor changes in the values would not significantly affect the quality of the image produced. The approximately optimum values are included in the invention and as such the word optimum should be construed to mean near optimum or close to optimum to within a range where the quality of the resultant image due to changes in value does not significantly decrease the quality of the resultant image.

The functionality associated with describing embodiments of the invention is described with a number of illustrative units. However, the units may be differently arranged so that the functionality of a single unit may be implemented with two or more units and the functionality of two or more units may be combined into a single unit. Moreover, the functionality may be differently arranged between illustrative units.

The various illustrative logics, logical blocks, units, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An auto focus (AF) adjusting apparatus comprising:
    an imaging sensor configured to capture light transmitted through an imaging lens to generate an image signal;
    an AF estimation value calculating unit configured to calculate an AF estimation value with respect to a first frequency band by using the image signal;
    a focus lens driver configured to drive a focus lens of the imaging lens in an optical axis direction;
    a location detector configured to detect a location of the focus lens;
    a near optimum location calculating unit configured to calculate a near optimum location of the AF estimation value by using the location of the focus lens and the AF estimation value;
    a controller configured to control the focus lens to move to the near optimum location; and
    a storage unit configured to store optimum location error information for correcting a difference between a second frequency band for determining an optimum location of an image surface of the imaging lens and the first frequency band,
    wherein the controller is configured to obtain optimum location error information corresponding to the optimum location of the image surface of the imaging lens, and correct the near optimum location calculated by the near optimum location calculation unit by using the obtained optimum location error information.

2. The AF adjusting apparatus of claim 1, comprising a replaceable lens and a body unit,
    wherein the imaging lens is included in the replaceable lens, and
    wherein the storage unit is included in the replaceable lens.

3. The AF adjusting apparatus of claim 1, comprising a replaceable lens and a body unit,
    wherein the imaging lens is included in the replaceable lens,
    wherein the replaceable lens is configured to store information regarding a type of lens,
    wherein the imaging sensor, the AF estimation value calculating unit, the storage unit, and the controller are included in the body unit,
    wherein the storage unit stores optimum location error information for each type of lens of the replaceable lens, and
    wherein the controller is configured to correct the optimum location by using the optimum location error information for each type of lens of the replaceable lens.

4. The AF adjusting apparatus of claim 1, wherein the controller is configured to obtain the optimum location error information according to latest information regarding a situation of the imaging lens.

5. The AF adjusting apparatus of claim 4, wherein the latest information of the imaging lens comprises at least one of information of a focal length, information of a location of the focus lens, and information of a photographing aperture.

6. The AF adjusting apparatus of claim 5, wherein the replaceable lens comprises a zoom lens,
    wherein the optimum location error information varies according to a focal length of the zoom lens, and
    wherein the controller is configured to change the optimum location error information according to the information of the focal length.

7. The AF adjusting apparatus of claim 5, wherein the optimum location error information varies according to the location of the focus lens, and
    wherein the controller is configured to change the optimum location error information according to the information of the location of the focus lens.

8. The AF adjusting apparatus of claim 5, wherein the optimum location error information varies according to the information of the photographing aperture, and
    wherein the controller is configured to convert the optimum location error information according to the information of the photographing aperture.

9. The AF adjusting apparatus of claim 1, wherein an error of the optimum location is represented by an equation of higher degree, and
    wherein the storage unit is configured to store coefficients of the equation of higher degree as the optimum location error information.

10. The AF adjusting apparatus of claim 9, wherein the equation of higher degree is a function of the optimum location and a focus deviation amount.

11. The AF adjusting apparatus of claim 9, wherein the equation of higher degree is a function of the optimum location and a driving amount of the focus lens.

12. The AF adjusting apparatus of claim 2, wherein each of the replaceable lens and the body unit comprises a communication pin for transmitting data.

13. The AF adjusting apparatus of claim 3, wherein each of the replaceable lens and the body unit comprises a communication pin for transmitting data.

14. The AF adjusting apparatus of claim 1, further comprising:
    a focus detection region setting unit configured to set a target region on which a focal point is to be detected, from among a plurality of focus detection regions, wherein the storage unit is configured to store the optimum location error information that varies according to a location of the set target region.

15. The AF adjusting apparatus of claim 14, wherein the optimum location error information varies according to a distance from the optical axis to the set target region.

16. The AF adjusting apparatus of claim 14, wherein the controller obtains the optimum location error information according to a location of the set target region.

17. An auto focus (AF) adjusting apparatus comprising:
an imaging sensor configured to capture light transmitted through an imaging lens to generate an image signal;
an AF estimation value calculating unit configured to calculate an AF estimation value with respect to a first frequency band by using the image signal;
a focus lens driver configured to drive a focus lens of the imaging lens;
a location detector configured to detect a location of the focus lens;
a near location calculating unit configured to calculate a near location of the AF estimation value by using the location of the focus lens and the AF estimation value;
a controller for configured to control the focus lens to move to the near location; and
a storage unit configured to store near location error information occurring due to a difference between a second frequency band for determining a near location of an image surface of the imaging lens and the first frequency band,
wherein the AF adjusting apparatus is configured to obtain near location error information with respect to the near location of the image surface of the imaging lens, and correct the near location by using the near location error information, and
wherein, when a difference between the first frequency band and the second frequency band is equal to or less than a reference, the controller is configured to move the focus lens to the near location obtained using the near location error information.

18. The AF adjusting apparatus of claim 17, wherein the controller comprises:
a comparison unit configured to compare the difference between the first frequency band and the second frequency band with the reference; and
a determination unit configured to determine whether error correction is to be performed according to the comparison result.

19. A camera system comprising a replaceable lens and a body unit, wherein the replaceable lens comprises:
an imaging lens comprising a zoom lens and a focus lens;
a driver configured to drive the focus lens;
a location detector configured to detect a location of the focus lens; and
a storage unit configured to store near location error information occurring due to a difference between a first frequency band for determining a near optimum location of an image surface of the imaging lens and a second frequency band for performing AF detection, and
wherein the body unit comprises:
an imaging sensor configured to generate an image signal;
an auto focus (AF) estimation value calculating unit configured to calculate an AF estimation value with respect to the second frequency band by using the image signal;
an near optimum location calculating unit configured to calculate an near optimum location of the AF estimation value; and a controller configured to drive the focus lens according to the near location of the AF estimation value, and
wherein the replaceable lens is configured to transmit information of the imaging lens to the body unit.

20. The camera system of claim 19, wherein the controller is configured to receive the near location error information from the replaceable lens, and correct an near optimum location of the AF estimation value according to the received near location error information, and control the focus lens to move to the corrected near location.

21. The camera system of claim 19, wherein the controller is configured to receive the near location error information from the replaceable lens, correct the near location of the AF estimation value according to the received near location error information, and transmit information for driving the focus lens to move the corrected near location to the replaceable lens.

22. The camera system of claim 19, wherein the body unit further comprises a frequency comparison unit configured to compare a difference between the first frequency band and the second frequency band with a reference, and
wherein the controller is configured to control the focus lens to move to the near location of the AF estimation value calculated by the near location calculating unit, when the difference between the first frequency band and the second frequency band is smaller than the reference.

23. The camera system of claim 19, wherein the body unit further comprises a frequency comparison unit for comparing a difference between the first frequency band and the second frequency band with a reference, and
wherein the controller is configured to receive the near location error information from the replaceable lens, correct a near optimum location of the AF estimation value according to the received near location error information, and control the focus lens to move to the corrected near location when the difference between the first frequency band and the second frequency band is greater than the reference.

24. A camera system comprising a replaceable lens and a body unit,
wherein the replaceable lens comprises:
an imaging lens comprising a zoom lens and a focus lens, configured to determine a near optimum location of an image surface in a first frequency band;
a driver configured to drive the focus lens; and
a first storage unit configured to store information of a type of lens, comprising information of the first frequency band, and
wherein the body unit comprises:
an imaging sensor configured to generate an image signal;
an auto focus (AF) estimation value calculating unit configured to calculate an AF estimation value with respect to the second frequency band by using the image signal;
a near optimum location calculating unit configured to calculate a near optimum location of the AF estimation value by using the AF estimation value;
a controller configured to drive the focus lens according to the near location of the AF estimation value, and
a second storage unit configured to store near location error information occurring due to a difference between the first frequency band and the second frequency band for each type of lens, and
wherein the replaceable lens is configured to transmit the information of the type of lens of the imaging lens to the body unit.

25. The camera system of claim 24, wherein the controller is configured to select near location error information corresponding to a near optimum location of the AF estimation value from among various pieces of near location error information corresponding to the type of lens of the imaging lens, and corrects the near location of the AF estimation value by using the selected near location error information.

26. The camera system of claim 24, wherein the body unit further comprises a frequency comparison unit configured to compare a difference between the first frequency band and the second frequency band with a reference, and
   wherein the controller is configured to control the focus lens to move to the near location of the AF estimation value calculated in the near location calculating unit, when the difference between the first frequency band and the second frequency band is smaller than the reference.

27. The camera system of claim 24, wherein the body unit further comprises a frequency comparison unit configured to compare a difference between the first frequency band and the second frequency band with a reference, and
   wherein the controller is configured to receive the near location error information from the replaceable lens, correct the near location of the AF estimation value according to the received near location error information, and control the focus lens to move to the corrected near location, when the difference between the first frequency band and the second frequency band is greater than the reference.

28. An auto focus (AF) method, the method comprising:
   capturing light transmitted through an imaging lens to generate an image signal;
   estimating AF values with respect to a first frequency band by using the image signal for different positions of the focus lens;
   calculating a near optimum location for the focus lens using the different positions of the focus lens and the estimated AF values;
   correcting the calculated near optimum location by using error correction information for correcting a difference between a second frequency band for determining a near optimum location of an image surface of the imaging lens and the first frequency band; and
   moving the focus lens to the corrected calculated near optimum location.

* * * * *